(12) United States Patent
Okazawa et al.

(10) Patent No.: US 10,362,190 B2
(45) Date of Patent: Jul. 23, 2019

(54) INFORMATION PROCESSING APPARATUS THAT INSTALLS MODULE ACCORDING TO A USAGE FORM OF THE INFORMATION PROCESSING APPARATUS METHOD OF CONTROLLING THE SAME, AND STORAGE MEDIUM

(71) Applicant: CANON KABUSHIKI KAISHA, Tokyo (JP)

(72) Inventors: Takashi Okazawa, Tokyo (JP); Chie Ito, Abiko (JP); Hiroshi Oya, Nagareyama (JP); Naoki Morita, Kashiwa (JP); Toru Sakaguchi, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/365,129

(22) Filed: Nov. 30, 2016

(65) Prior Publication Data
US 2017/0163835 A1 Jun. 8, 2017

(30) Foreign Application Priority Data
Dec. 2, 2015 (JP) .................... 2015-235823

(51) Int. Cl.
*G06F 3/12* (2006.01)
*H04N 1/00* (2006.01)
(Continued)

(52) U.S. Cl.
CPC ........... *H04N 1/00973* (2013.01); *G06F 8/61* (2013.01); *G06F 9/4411* (2013.01); *H04N 1/00204* (2013.01); *H04N 2201/0094* (2013.01)

(58) Field of Classification Search
CPC ........... H04N 1/00204; H04N 1/00973; H04N 2201/0094; G06F 8/61; G06F 9/4411;
(Continued)

(56) References Cited

U.S. PATENT DOCUMENTS 8,773,694 B2 * 7/2014 Takagi .................. G06F 3/1205
358/1.15
9,013,725 B2 * 4/2015 Yamada .................. G06F 3/122
358/1.13
(Continued)

FOREIGN PATENT DOCUMENTS

JP 2005208695 A 8/2005
JP 2009086905 A 4/2009
(Continued)

OTHER PUBLICATIONS

Office Action issued in Japanese Application No. 2015-235823 dated May 21, 2019.

*Primary Examiner* — Gabriel I Garcia
(74) *Attorney, Agent, or Firm* — Rossi, Kimms & McDowell LLP

(57) ABSTRACT

An information processing apparatus that enables a user to install a desired module with ease. A plurality of modules are installed into a PC as an information processing apparatus for performing print processing in an MFP as an image processing apparatus. A usage form of the PC is set. Required ones of the plurality of modules are displayed based on the set usage form, and are installed into the PC.

10 Claims, 21 Drawing Sheets

(51) Int. Cl.
*G06F 8/61* (2018.01)
*G06F 9/4401* (2018.01)

(58) Field of Classification Search
CPC .... G06F 3/1204; G06F 3/1218; G06F 3/1225; G06F 3/1228; G06F 3/1277; G06F 3/1285; G06F 3/1288
USPC ................ 358/1.1–1.18, 402, 474
See application file for complete search history.

(56) References Cited

U.S. PATENT DOCUMENTS

| | | | |
|---|---|---|---|
| 2003/0174360 A1* | 9/2003 | Ohshima | G06F 3/1203 358/1.15 |
| 2006/0101023 A1* | 5/2006 | Han | H04L 67/34 |
| 2006/0256373 A1* | 11/2006 | Matsumoto | G06F 3/1204 358/1.15 |
| 2015/0169267 A1* | 6/2015 | Hirakawa | G06F 3/1225 358/1.13 |
| 2016/0085484 A1* | 3/2016 | Ichikawa | G06F 3/1205 358/1.13 |
| 2016/0179450 A1* | 6/2016 | Shirai | G06F 3/1247 358/1.15 |

FOREIGN PATENT DOCUMENTS

| | | |
|---|---|---|
| JP | 2010182116 A | 8/2010 |
| JP | 2011034460 A | 2/2011 |
| JP | 2014044745 A | 3/2014 |

* cited by examiner

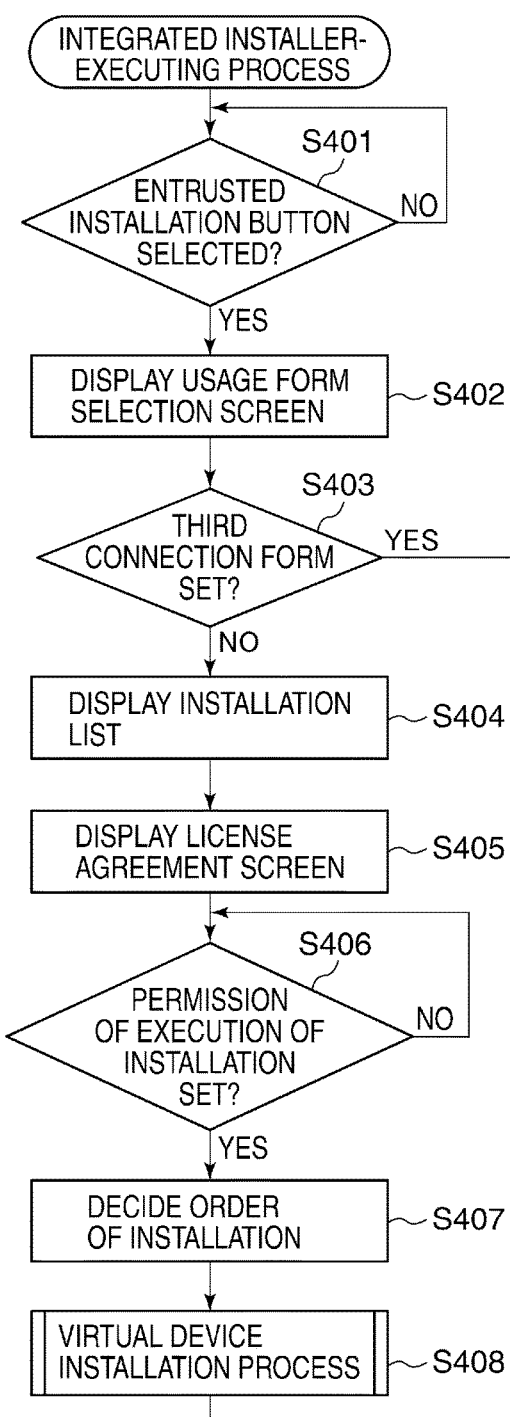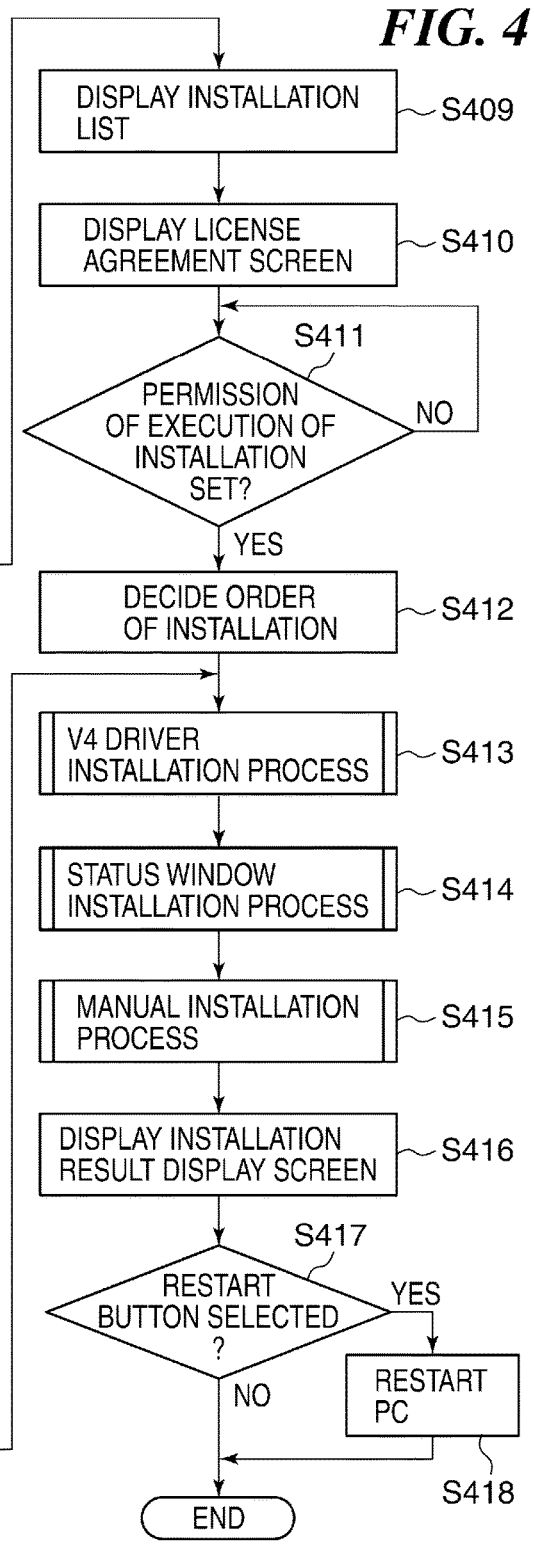
FIG. 4

FIG. 16A

```
┌─────────────────────────────────────────────┐ ~1600
│ V4 PRINTER DRIVER INSTALLER            │ × │
├─────────────────────────────────────────────┤
│ PRINTER INFORMATION SETTING                 │
├─────────────────────────────────────────────┤
│ SELECTED PRINTER: Print3000                 │
│ DRIVER TO BE USED: UF DRIVER    Ver20.01   │
│ IP ADDRESS:  [127.0.0.1]          ~1601    │
│ PORT NUMBER: [37561]              ~1602    │
│ PORT NAME:   [127.0.0.1_Port37561] ~1603   │
│ PRINTER NAME:[Print3000]          ~1604    │
│                                             │
│                              1605           │
│              [RETURN][COMPLETE][CANCEL]     │
└─────────────────────────────────────────────┘
```

FIG. 16B

```
┌─────────────────────────────────────────────┐ ~1606
│ V4 PRINTER DRIVER INSTALLER            │ × │
├─────────────────────────────────────────────┤
│ SELECTION OF PRINTER AS INSTALLATION DESTINATION │
│ Select a printer to be added.               │
│                            1607             │
│ [IPv4 DEVICE][IPv6 DEVICE]                  │
│ PRINTER LIST:                               │
│ MODEL NAME  VIRTUAL DEVICE NAME  IP ADDRESS    PORT NUMBER │
│ ☑ Print3000   Print01    172.24.111.234   31256 │
│ ☑ Print3000   Print02    172.24.111.237   32157 │
│ ☐ Print3000   Print05    172.24.111.238   32180 │
│                           1608        1609  │
│ [SELECT/DESELECT ALL][RE-SEARCH][MANUALLY SEARCH BY IP ADDRESS] │
│                    [RETURN][NEXT][CANCEL]   │
└─────────────────────────────────────────────┘
                                    1610
```

INFORMATION PROCESSING APPARATUS THAT INSTALLS MODULE ACCORDING TO A USAGE FORM OF THE INFORMATION PROCESSING APPARATUS METHOD OF CONTROLLING THE SAME, AND STORAGE MEDIUM

BACKGROUND OF THE INVENTION

Field of the Invention

The present invention relates to an information processing apparatus, a method of controlling the same, and a storage medium, and more particularly to an information processing apparatus that installs a printer driver module, a method of controlling the same, and a storage medium.

Description of the Related Art

There has been known a printing system in which print processing is performed by a personal computer (PC) as an information processing apparatus and an MFP as an image processing apparatus. In print processing performed by the printing system, the PC generates print data, and transmits the generated print data to the MFP, and the MFP performs printing based on the received print data. To perform the above-mentioned print processing by the printing system, a printer driver module which is compatible with the MFP connected to the PC is installed in the PC (see e.g. Japanese Patent Laid-Open Publication No. 2014-44745). The printer driver module incorporates a user interface module for enabling a user to make settings for printing, a print data generation module for generating print data based on the settings, and so forth. Further, a version 3 printer driver module (hereinafter simply referred to as the "V3 driver") compatible with the conventional OS (Operating System) can newly incorporate, in addition to the above-mentioned modules, a communication control module for controlling data communication between the PC and the MFP. The communication control module performs transmission control processing for controlling transmission of print data from the PC to the MFP, and execution status acquisition processing for acquiring data concerning the execution status of printing of print data from the MFP, to the PC.

In recent years, as a printer driver module compatible with Windows 8 (registered trademark) and subsequent versions of the OS, a version 4 printer driver module (hereinafter simply referred to as the "V4 driver") has been developed, and a shift from the V3 driver to the V4 driver is widely underway. Incidentally, the V4 driver cannot incorporate a module for function expansion, such as the communication control module. Therefore, the PC of which the V3 driver is simply updated to the V4 driver cannot perform processing corresponding to transmission control processing and execution status acquisition processing conventionally capable of being performed by the V3 driver. More specifically, in the printing system, when the printer driver module of the PC is changed to the V4 driver, it is impossible to perform printing based on the print data generated by the PC, or display the printing execution status. To eliminate this inconvenience, in a case where the V4 driver is installed in the PC, a virtual device module for the MFP is installed in the PC to thereby enable data communication between the PC and the MFP using the virtual device module. By installing the virtual device module, even the PC having the V4 driver installed therein can perform processing corresponding to transmission control processing and execution status acquisition processing performed by the V3 driver.

However, the PC having the V4 driver installed therein necessitates the virtual device module in some cases, but does not necessitate the virtual device module in the other cases. For example, in a case where the PC is directly connected to the MFP, the PC directly performs data communication of print data and data concerning the execution status of the print data, with the MFP, and hence the virtual device module is required for the PC. On the other hand, in a where the PC is not directly connected to the MFP, for example, in a case where the PC is connected to the MFP via a server, the PC does not directly perform data communication with the MFP, and hence if the server can perform data communication with the MFP, the virtual device module is not required for the PC. Further, when installing the virtual device module, a user is required to make settings, including the setting of a port number used for data communication between the PC and the MFP. That is, for the PC having the V4 driver installed therein, the necessity of installation of the virtual device module and the necessity of making settings are different depending on a situation. Therefore, it is difficult for the user to install the desired module.

SUMMARY OF THE INVENTION

The present invention provides an information processing apparatus that enables a user to install a desired module with ease, a method of controlling the same, and a storage medium.

In a first aspect of the present invention, there is provided an information processing apparatus into which a plurality of modules are installed for performing print processing in an image processing apparatus, comprising a usage form-setting unit configured to set a usage form of the information processing apparatus, a display unit configured to display required ones of the plurality of modules based on the set usage form, and an installation unit configured to install the displayed modules.

In a second aspect of the present invention, there is provided a method of controlling an information processing apparatus into which a plurality of modules are installed for performing print processing in an image processing apparatus, comprising setting a usage form of the information processing apparatus, displaying required ones of the plurality of modules based on the set usage form, and installing the displayed modules.

In a third aspect of the present invention, there is provided a non-transitory computer-readable storage medium storing a computer-executable program for executing a method of controlling an information processing apparatus into which a plurality of modules are installed for performing print processing in an image processing apparatus, wherein the method comprises setting a usage form of the information processing apparatus, displaying required ones of the plurality of modules based on the set usage form, and installing the displayed modules.

According to the present invention, it is possible to easily install a desired module.

Further features of the present invention will become apparent from the following description of exemplary embodiments (with reference to the attached drawings).

BRIEF DESCRIPTION OF THE DRAWINGS

FIG. 4 is a flowchart of an integrated installer-executing process performed by the PC.

FIG. 16A is a diagram showing an installation setting screen displayed on the PC.

FIG. 16B is a diagram showing a search result-displaying screen displayed on the PC.

DESCRIPTION OF THE EMBODIMENTS

Before describing an embodiment of the present invention, a description will be given of a case where a printer driver module installed in the PC is changed from the V3 driver to the V4 driver in a printing system in which print processing is performed by a PC and an MFP. The V3 driver can newly incorporate a communication control module for controlling data communication between the PC and the MFP, and a display control module for controlling the display of the execution status of print processing performed by the PC and the MFP. The communication control module executes transmission control processing for controlling transmission of print data from the PC to the MFP, and execution status acquisition processing for acquiring data concerning the execution status of the print data from the MFP. Further, the display control module executes execution status display processing for displaying the execution status of the print data, based on the acquired data concerning the execution status. On the other hand, the V4 driver cannot incorporate another module for function expansion, such as the communication control module and the display control module. Therefore, the PC, of which the V3 driver is simply updated to the V4 driver, cannot perform processing corresponding to transmission control processing, execution status acquisition processing, and execution status display processing, which can be executed by the V3 driver. To solve this problem, in the present embodiment, in a case where the printer driver module of a PC 101 as an information processing apparatus, appearing in FIG. 1, described hereinafter, is changed from the V3 driver to the V4 driver, a module for performing processing corresponding to the processing operations which can be executed by the V3 driver is installed into the PC 101. More specifically, a status window module 109 and a virtual device-associated module 110 are installed into the PC 101 as the above-mentioned modules.

The present invention will now be described in detail below with reference to the accompanying drawings showing embodiments thereof.

Figure 1:
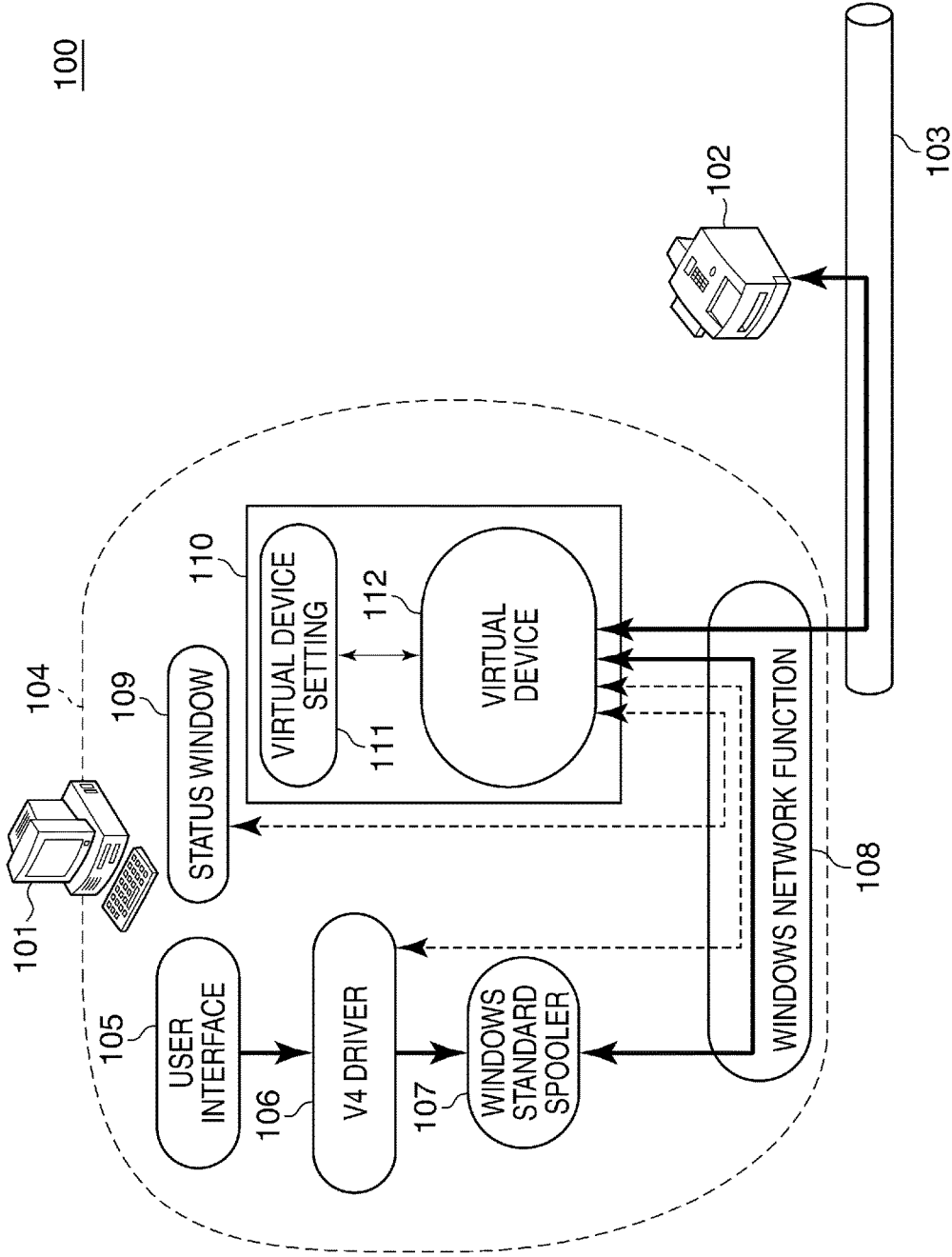
FIG. 1 is a schematic diagram of a printing system including a PC as an information processing apparatus according to an embodiment of the present invention.

FIG. 1 is a schematic diagram of a printing system 100 including the PC 101 as the information processing apparatus according to the embodiment of the present invention.

Referring to FIG. 1, the printing system 100 includes the PC 101 and an MFP 102, and the PC 101 and the MFP 102 are connected to each other via a LAN 103. Note that in the present embodiment, the case where the PC 101 and the MFP 102 are connected via the LAN 103 will be described by way of example, but the method of connecting between the PC 101 and the MFP 102 is not limited to connection via the LAN 103. For example, the PC 101 and the MFP 102 may be connected to each other e.g. via a USB cable. Further, a plurality of MFPs may be connected to the PC.

The PC 101 generates print data according to a user's instruction for performing print processing, and transmits the generated print data to the MFP 102. The PC 101 includes software 104 for performing print processing in cooperation with the MFP 102. The software 104 includes a user interface module 105, the V4 driver, denoted by reference numeral 106, a Windows standard spooler module 107, the status window module 109, and the virtual device-associated module 110. The virtual device-associated module 110 includes a virtual device-setting module 111 and a virtual device module 112 (data communication module). When the printer driver module is updated to the V4 driver 106, the PC 101 installs required modules using an integrated installer 301, described hereinafter with reference to FIG. 3. Processing of each module is performed by a CPU 201, described hereinafter with reference to FIG. 2, which executes control programs stored in a ROM 204.

The user interface module 105 receives an instruction for performing print processing from a user. The V4 driver 106 generates print data according to the user's instruction for performing print processing. The Windows standard spooler module 107 is a print spooler of the OS of the Microsoft Windows, which has been installed in the PC 101 in advance. The Windows standard spooler module 107 temporarily stores the generated print data, and transmits the stored print data to the virtual device module 112 using a Windows network function 108. The status window module 109 acquires information on the execution status of printing based on the transmitted print data from the virtual device module 112 using the Windows network function 108. Further, the status window module 109 displays the execution status of printing based on the print data on a display section, not shown, of the PC 101 using the acquired information. The virtual device-associated module 110 is provided in a manner associated with the MFP 102, and for example, in a case where a plurality of MFPs 102 are connected to the PC 101, different virtual device-associated modules 110 are provided in association with the MFPs 102, respectively. The virtual device-setting module 111 performs configuration and management of the virtual device module 112. The virtual device module 112 relays data communication between each of the V4 driver 106, the Windows standard spooler module 107, and the status window module 109, and the MFP 102, as a virtual device of the MFP 102. With this configuration, the virtual device module 112 is capable of performing processing corresponding to transmission control processing and execution status acquisition processing. The MFP 102 performs printing based on the received print data.

Figure 2:
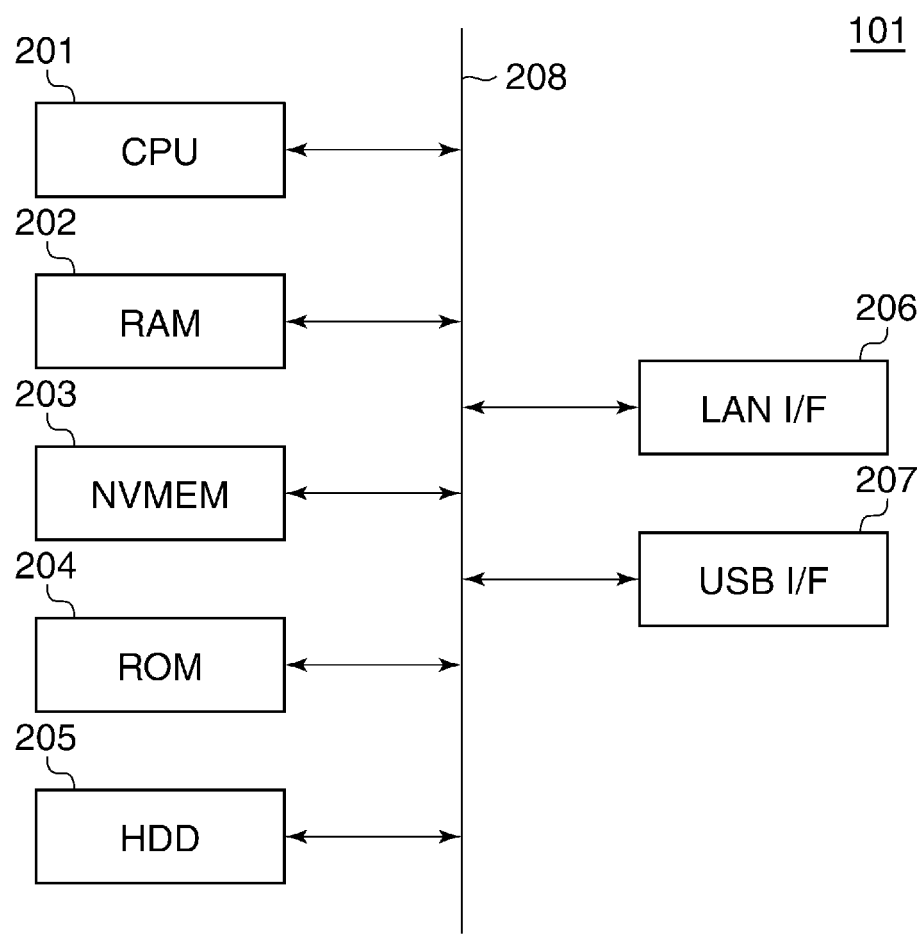
FIG. 2 is a schematic block diagram showing a hardware configuration of the PC appearing in FIG. 1.

FIG. 2 is a schematic block diagram of the hardware of the PC 101 appearing in FIG. 1.

Referring to FIG. 2, the PC 101 includes the CPU 201, a RAM 202, a NVMEM (Non-Volatile Memory) 203, the ROM 204, an HDD 205, a LAN interface 206, and a USB interface 207. The CPU 201, the RAM 202, the NVMEM 203, the ROM 204, the HDD 205, the LAN interface 206, and the USB interface 207 are interconnected via a system bus 208.

The CPU 201 controls the overall operation of the PC 101, and performs processing of the software 104 and processing of software 300, described hereinafter with reference to FIG. 3, by executing control programs stored in the ROM 204. The RAM 202 is used as a work area for the CPU 201, and is also used as an area for temporarily storing data. The NVMEM 203 is a nonvolatile memory, and stores configuration information and the like. The ROM 204 is a nonvolatile memory, and stores the control programs executed by the CPU 201. The HDD 204 stores data. The LAN interface 206 performs data communication with an apparatus connected to the LAN 103. The USB interface 207 performs data communication with an apparatus connected via a USB cable.

Figure 3:
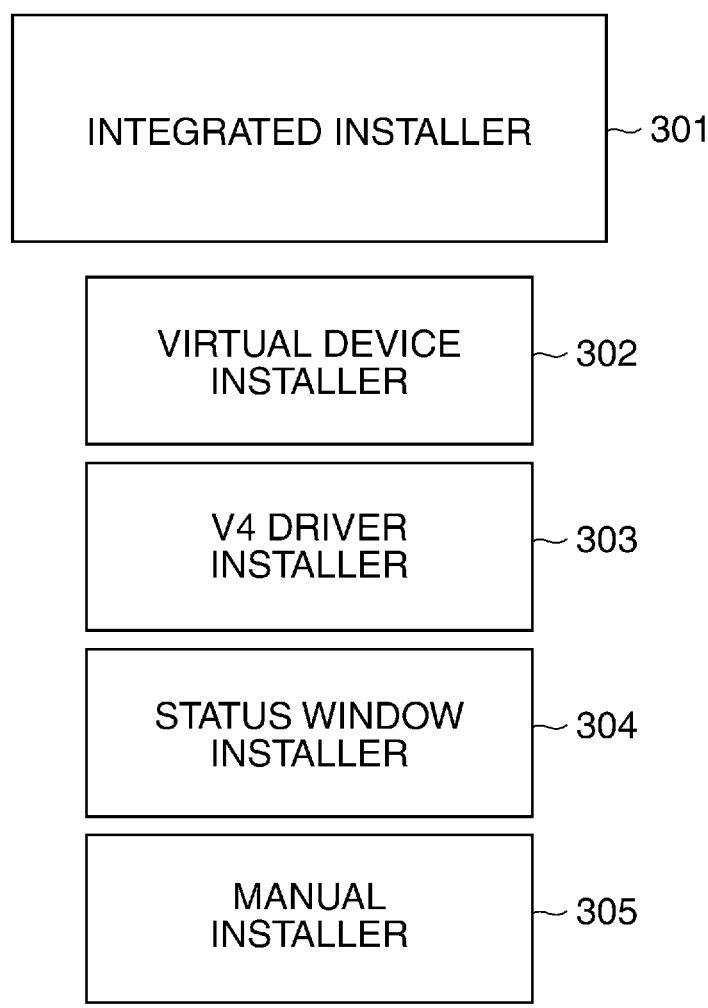
FIG. 3 is a schematic block diagram of an installer of the PC.

FIG. 3 is a schematic block diagram of an installer of the PC 101 appearing in FIG. 1.

Referring to FIG. 3, the PC 101 includes the software 300 for installing modules. The software 300 includes the integrated installer 301, a virtual device installer 302, a V4 driver installer 303, a status window installer 304, and a manual installer 305.

The integrated installer 301 manages and controls the virtual device installer 302, the V4 driver installer 303, the status window installer 304, and the manual installer 305. The virtual device installer 302 installs the virtual device-associated module 110 into the PC 101, and the V4 driver installer 303 installs the V4 driver 106 into the PC 101. The status window installer 304 installs the status window module 109 into the PC 101, and the manual installer 305 installs a manual associated with installation of each module into a set storage destination.

FIG. 4 is a flowchart of an integrated installer-executing process performed by the PC 101 appearing in FIG. 1.

The process in FIG. 4 is performed by the CPU 201, appearing in FIG. 2, executing a control program stored in the ROM 204.

Figure 5:
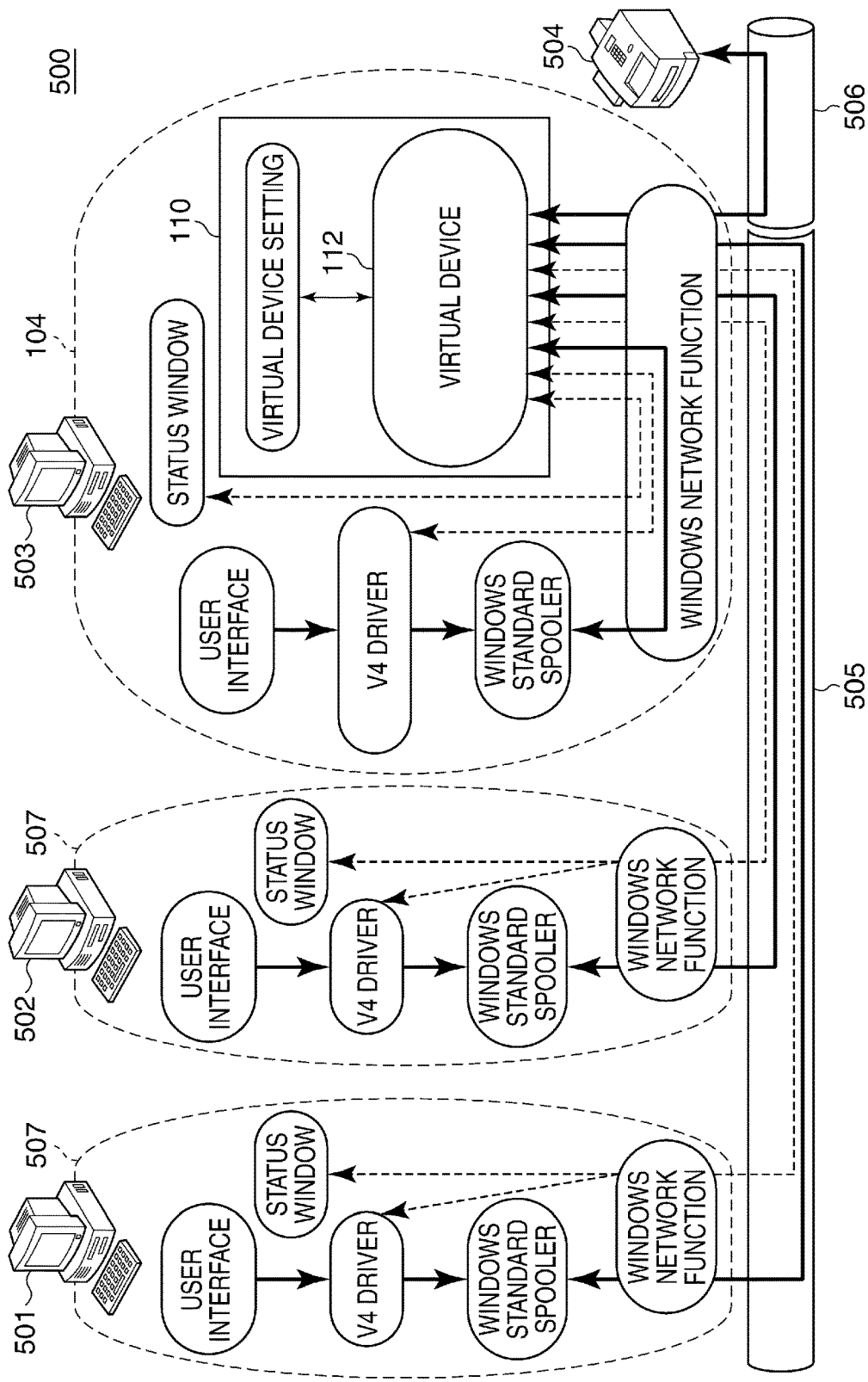
FIG. 5 is a block diagram useful in explaining forms of connection in a printing system including PCs and a server as an information processing apparatus, according to the embodiment.

In the present example, an apparatus in which the V4 driver is installed is not limited to an apparatus directly connected to the MFP 102, such as the PC 101, but there is a case, for example, where PCs 501 and 502 are connected to an MFP 504 via a server 503, as described hereafter with reference to FIG. 5.

FIG. 5 is a block diagram useful in explaining forms of connection in a printing system 500 including the PCs 501 and 502, and the server 503 as an information processing apparatus, according to the embodiment.

Referring to FIG. 5, the printing system 500 includes the PCs 501 and 502, the server 503, and the MFP 504. The PCs 501 and 502, and the server 503 are interconnected via a LAN 505, and the server 503 and the MFP 504 are connected to each other via a LAN 506. In the printing system 500, print data items generated by the PCs 501 and 502 are transmitted from the PCs 501 and 502 to the server 503, respectively, and the server 503 transmits the received print data items to the MFP 504 using the virtual device module 112.

When the V4 driver 106 is installed into each of the PCs 501 and 502 and the server 503, there are a case where the virtual device module 112 is required and a case where the virtual device module 112 is not required. For example, in a case where an apparatus is directly connected to the MFP 504, as is the case with the server 503, the server 503 directly performs data communication with the MFP 504, e.g. for transmission of print data, and hence the virtual device module 112 is required for the server 503. Therefore, the virtual device-associated module 110 including the virtual device module 112 is installed in the server 503, as shown in FIG. 5. On the other hand, in a case where an apparatus is connected to the MFP 504 via the server 503, as is the case with the PCs 501 and 502, the PCs 501 and 502 do not directly perform data communication with the MFP 504, and hence if only the server 503 can perform data communication with the MFP 504, the virtual device module 112 is not required for the PCs 501 and 502. Therefore, the virtual device-associated module 110 is not installed in either of the PCs 501 and 502, as shown in software 507 in FIG. 5. That is, for PCs having installed the V4 driver therein, the necessity of installation of the virtual device-associated module 110 is different depending on the situation.

Figure 7:
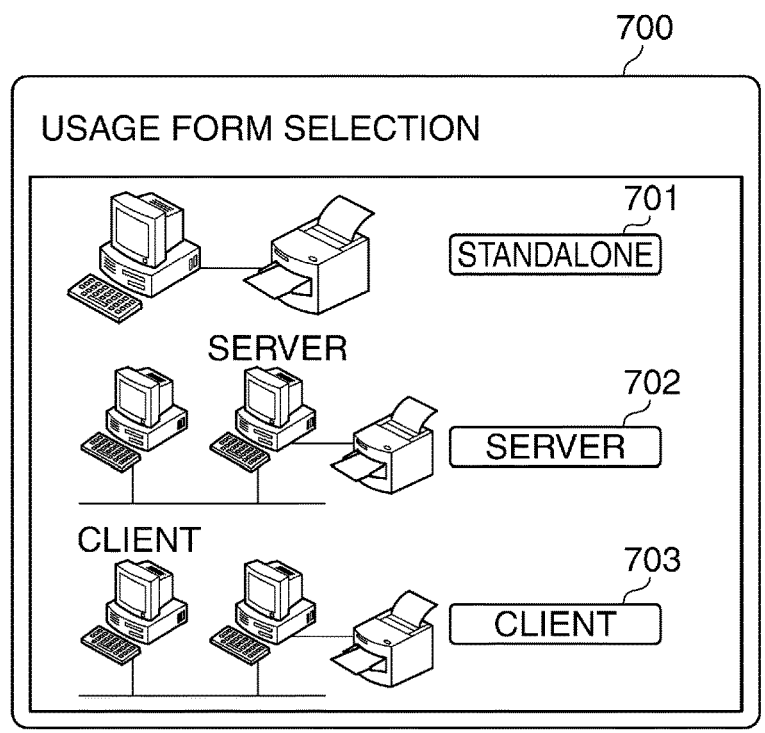
FIG. 7 is a diagram showing an example of a usage form selection screen displayed on the PC.

To cope with this, in the present embodiment, required ones of a plurality of modules are installed based on a usage form set on a usage form selection screen 700 (usage form-setting unit), described hereinafter with reference to FIG. 7.

Figure 6:
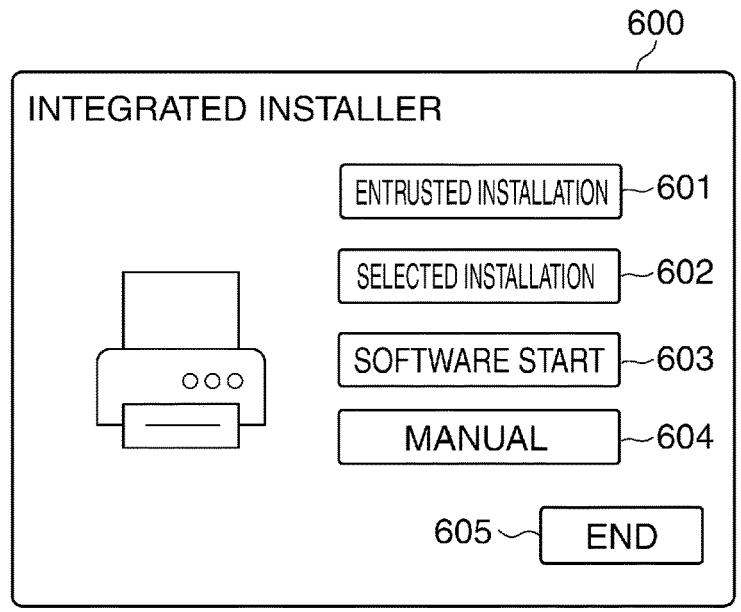
FIG. 6 is a diagram showing an example of an integrated installer-setting screen displayed on the PC.

Referring to FIG. 4, first, when the integrated installer 301 is started, the CPU 201 displays an integrated installer-setting screen 600, shown in FIG. 6, for enabling the user to configure processing to be performed by the integrated installer 301. The integrated installer-setting screen 600 includes an entrusted installation button 601, a selected installation button 602, a software start button 603, a manual button 604, and an end button 605. The entrusted installation button 601 is for installing required ones of a plurality of modules based on a form of connection of the PC 101. The selected installation button 602 is for installing modules set by a user. The software start button 603 is for starting each installer managed by the integrated installer 301. The manual button 604 is for displaying a manual associated with each installation executed by the integrated installer 301. The end button 605 is for terminating the configuration on the integrated installer-setting screen 600. Then, if the entrusted installation button 601 is selected on the integrated installer-setting screen 600 (YES to a step S401), the CPU 201 displays the usage form selection screen 700, shown in FIG. 7 (step S402). The usage form selection screen 700 is used for setting a form of connection between the PC 101 and the MFP 102 as the usage form of the PC 101, and includes connection form-setting buttons 701 to 703. The connection form-setting button 701 is set in a case where the form of connection is, for example, a form of connection of the PC 101, as shown in FIG. 1 (hereinafter referred to as the "first connection form"), i.e. when the PC 101 and the MFP 102 are directly connected to each other. The connection form-setting button 702 is set in a case where the form of connection is, for example, a form of connection of the server 503, as shown in FIG. 5 (hereinafter referred to as the "second connection form"), i.e. when the server 503 is connected to the MFP 504 and the PCs 501 and 502. The connection form-setting button 703 is set when the form of connection is, for example, a form of connection of each of the PCs 501 and 502, as shown in FIG. 5 (hereinafter referred to as the "third connection form"), i.e. when the PCs 501 and 502 are connected to the MFP 504 via the server 503. Then, the CPU 201 determines whether or not the connection form-setting button 703 is selected, i.e. whether or not the third connection form is set on the usage form selection screen 700 (step S403).

Figure 8A:
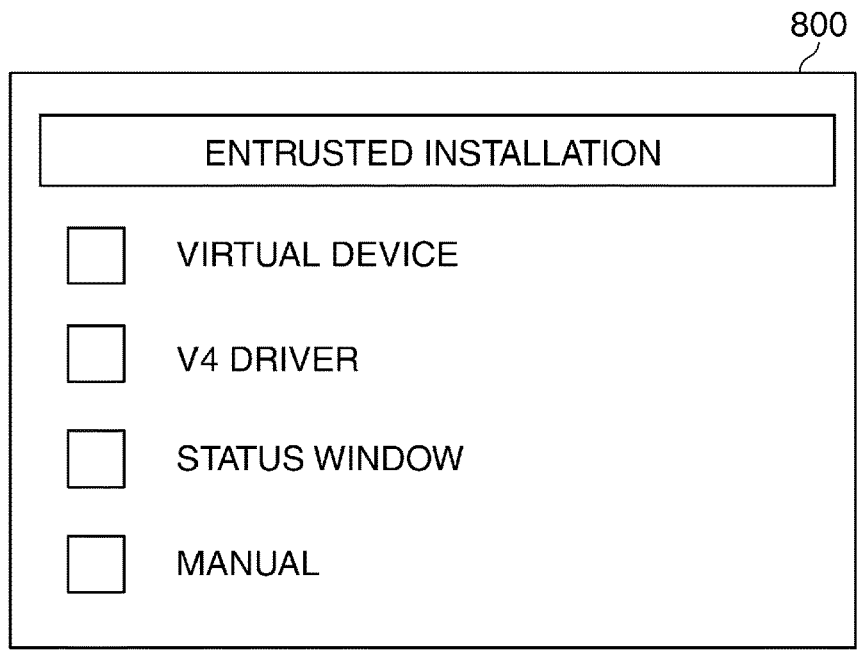
FIG. 8A is a diagram showing an example of an installation list displayed on the PC, which is associated with a first connection form and a second connection form.

If it is determined in the step S403 that not the third connection form, but the first or second connection form is selected, the CPU 201 displays an installation list 800 shown in FIG. 8A, which is a list of modules required for the first or second connection form (step S404) (operation of a display unit). The installation list 800 includes information indicating that the required modules are the virtual device-associated module 110, the V4 driver 106, the status window module 109, and the manual. Then, the CPU 201 displays a license agreement screen, not shown, for setting permission of execution of installation of the required modules (step S405). Then, if the permission of execution of installation of the required modules is set by the user (YES to a step S406), the CPU 201 decides an order of installation of the required modules (step S407) (operation of an installation order decision unit). In the step S407, the CPU 201 decides the order of installation such that the virtual device-associated module 110 for performing data communication with the MFP 102 is installed first, and then, the V4 driver 106, the status window module 109, and the manual are installed in the mentioned order. Then, the CPU 201 performs a virtual device installation process, described hereinafter with reference to FIGS. 9A and 9B, according to the decided order of installation (step S408) to thereby install the virtual device-associated module 110. Then, after execution of the virtual device installation process is completed, the CPU 201 executes a step S413, described hereinafter.

Figure 8B:
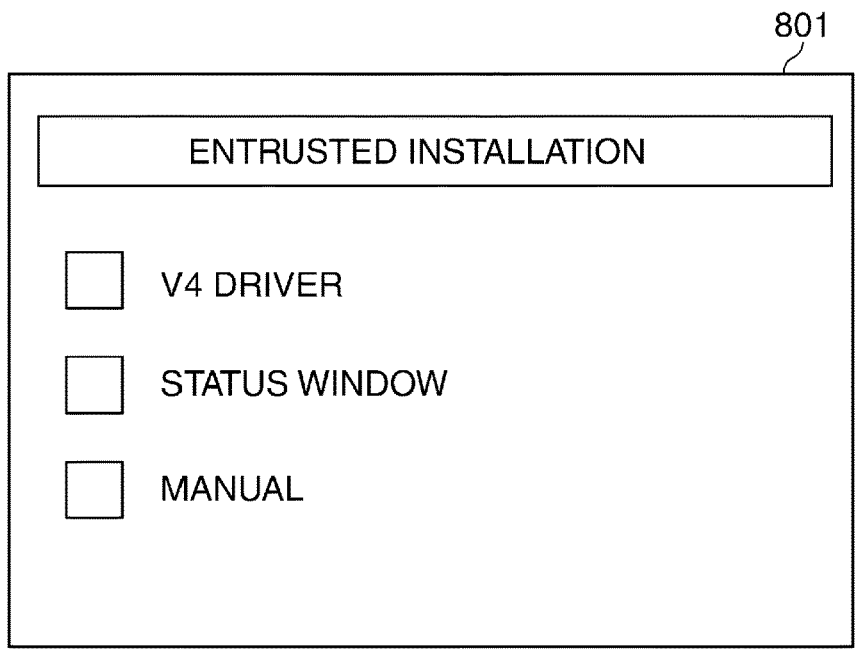
FIG. 8B is a diagram showing an example of an installation list associated with a third connection form.

If it is determined in the step S403 that the third connection form is selected, the CPU 201 displays an installation list 801 shown in FIG. 8B, which is a list of modules required for the third connection form (step S409) (operation of a display unit). The installation list 801 includes information indicating that the required modules are the V4 driver 106, the status window module 109, and the manual. That is, in the present embodiment, the required ones of the plurality of modules are installed based on the set form of connection (usage form). Then, the CPU 201 displays the license agreement screen (step S410). Then, if the permission of execution of installation of the required modules is set by the user (YES to a step S411), the CPU 201 decides an order of installation of the required modules based on the set form of connection (step S412). In the step S412, the CPU 201 decides the order of installation such that the V4 driver 106, the status window module 109, and the manual are installed in the mentioned order. Then, the CPU 201 performs a V4 driver installation process, described hereinafter with reference to FIGS. 14A and 14B, according to the decided order of installation (step S413) to thereby install the V4 driver 106. Then, after the execution of the V4 driver installation process is completed, the CPU 201 executes a status window installation process, described hereinafter with reference to FIG. 18 (step S414) to thereby install the status window module 109. Then, after the execution of the status window installation process is completed, the CPU 201 executes a manual installation process, described hereinafter with reference to FIG. 19 (step S415) to thereby install the manual associated with each installation. Then, the CPU 201 displays an installation result display screen, not shown, indicating that the installation of all of the required modules is completed (step S416). The installation result display screen includes a restart button for instructing the restart of the PC 101, and the CPU 201 determines whether or not the restart button is selected by the user (step S417).

If it is determined in the step S417 that the restart button is selected by the user, the CPU 201 restarts the CPU 101 (step S418), followed by terminating the present process. On the other hand, if it is determined in the step S417 that the restart button is not selected by the user, the CPU 201 terminates the present process.

Figure 9A:
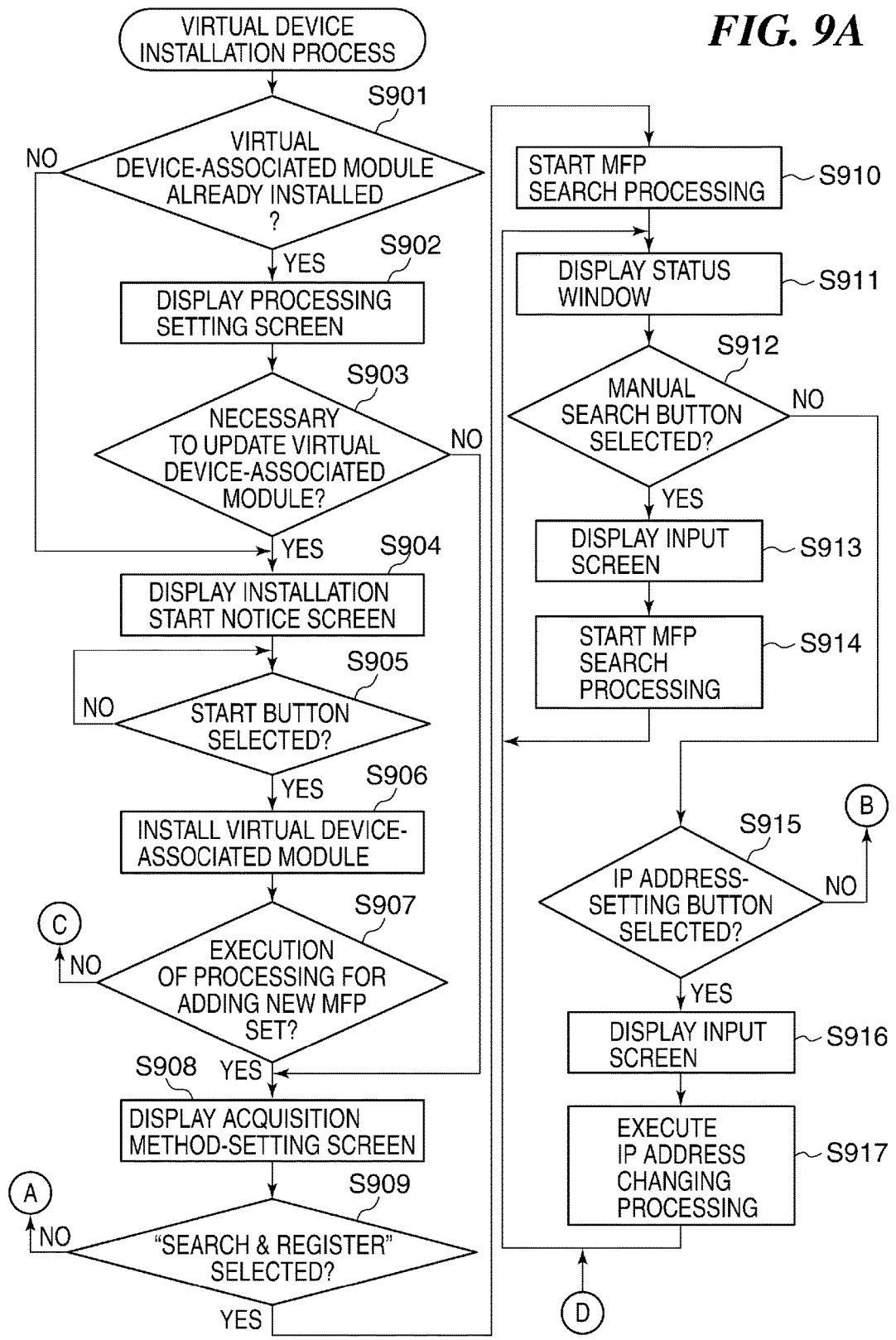
FIG. 9A is a flowchart of a virtual device installation process performed in a step of the integrated installer-executing process in FIG. 4.
Figure 9B:
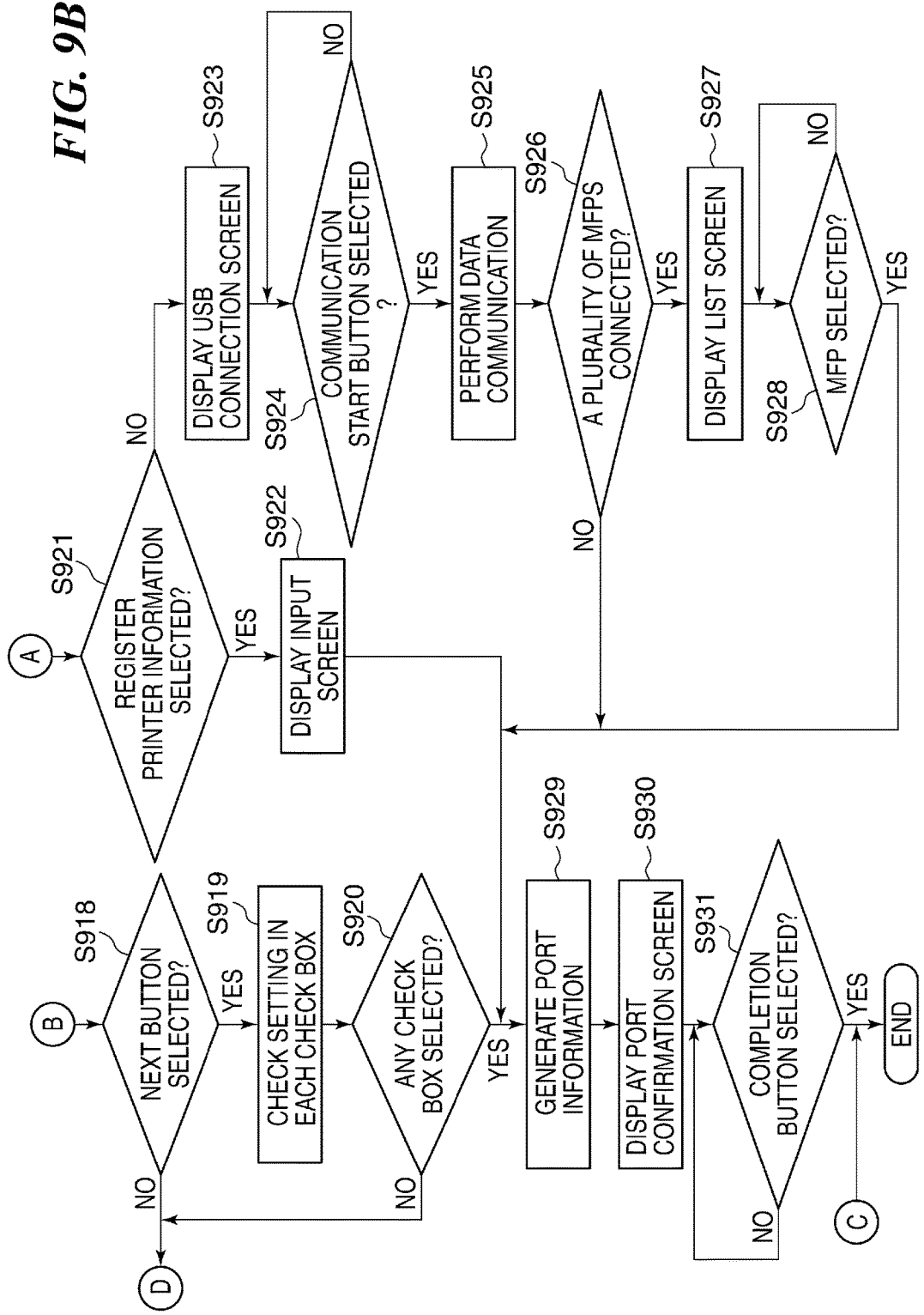
FIG. 9B is a continuation of FIG. 9A.

FIGS. 9A and 9B are a flowchart of the virtual device installation process performed in the step S408 in FIG. 4.

Referring to FIGS. 9A and 9B, first, the CPU 201 determines whether or not the virtual device-associated module 110 has already been installed in the PC 101 (step S901).

Figure 10A:
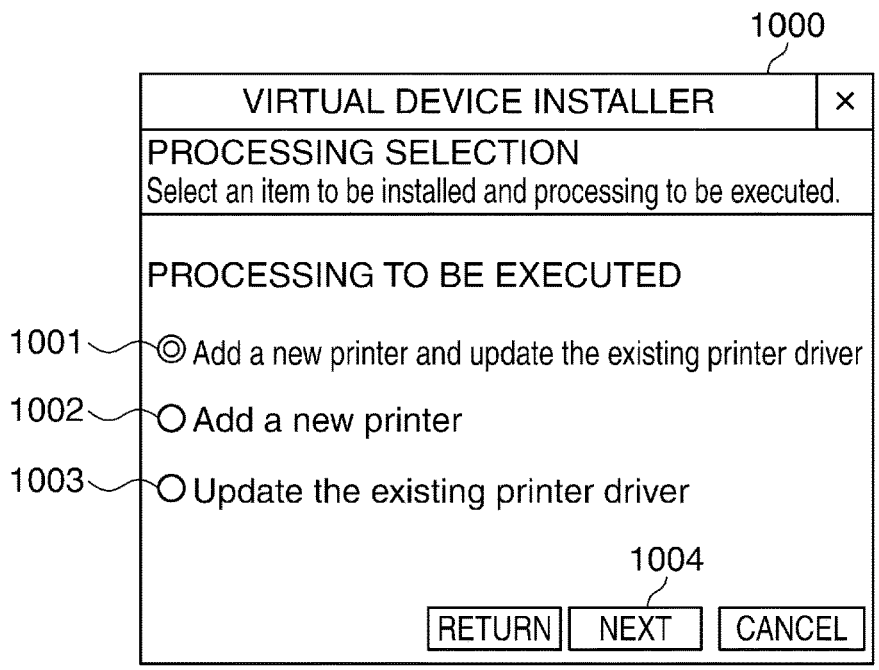
FIG. 10A is a diagram showing a processing setting screen displayed on the PC.

If it is determined in the step S901 that the virtual device-associated module 110 has not been installed, the CPU 201 executes a step S904 et seq., described hereinafter. On the other hand, if it is determined in the step S901 that the virtual device-associated module 110 has already been installed, the CPU 201 displays a processing setting screen 1000, shown in FIG. 10A, for setting processing to be performed by the virtual device installer 302 (step S902). The processing setting screen 1000 includes setting fields 1001 to 1003 and a next button 1004. The setting field 1001 is a field for setting the execution of processing for adding a new MFP (printer) and processing for updating the existing printer driver module. In the present embodiment, by the execution of the processing for adding a new MFP, the virtual device installer 302 newly installs the virtual device-associated module 110 associated with the MFP to be added. Further, by the execution of processing for updating the existing printer driver module, the virtual device installer 302 updates the existing printer driver module without newly installing the virtual device-associated module 110. The setting field 1002 is a field for setting the execution of processing for adding a new MFP. The setting field 1003 is a field for setting the execution of processing for updating the existing printer driver module. The next button 1004 is an operation button for setting detailed information associated with a setting selected from the setting fields 1001 to 1003. Then, the CPU 201 determines whether or not it is necessary to update the virtual device-associated module 110 (step S903). For example, in the step S903, if the virtual device-associated module 110 which has already been installed is not the latest version, the CPU 201 determines that it is necessary to update the virtual device-associated module 110. On the other hand, if the virtual device-associated module 110 which has already been installed is the latest version, the CPU 201 determines that it is unnecessary to update the virtual device-associated module 110.

If it is determined in the step S903 that it is unnecessary to update the virtual device-associated module 110, the CPU 201 executes a step S908 et seq., described hereinafter. On the other hand, if it is determined in the step S903 that it is necessary to update the virtual device-associated module 110, the CPU 201 displays an installation start notice screen, not shown, including a start button for instructing to start installation of the virtual device-associated module 110 (step S904). Then, if the start button is selected by the user (YES to a step S905), the CPU 201 installs the virtual device-associated module 110 (step S906). Then, the CPU 201 determines whether or not execution of processing for adding a new MFP has been set on the processing setting screen 1000 (step S907).

Figure 10B:
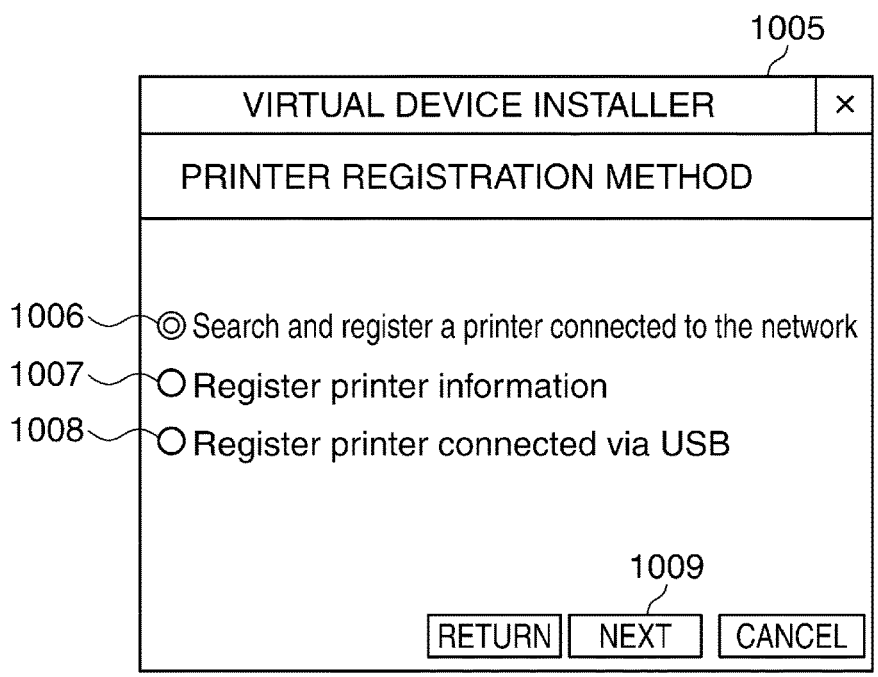
FIG. 10B is a diagram showing an acquisition method-setting screen displayed on the PC.

If it is determined in the step S907 that execution of processing for adding a new MFP has not been set on the processing setting screen 1000, the CPU 201 immediately terminates the present process. On the other hand, if it is determined in the step S907 that the setting made on the processing setting screen 1000 includes execution of processing for adding a new MFP, the CPU 201 displays an acquisition method-setting screen 1005, shown in FIG. 10B, for setting a method of acquiring information on an MFP to be associated with the virtual device-associated module 110 (step S908). The acquisition method-setting screen 1005 includes setting fields 1006 to 1008 and a next button 1009. The setting field (search & registration-setting field) 1006 is a field for setting the acquisition of the information from MFPs connected to the LAN 103 (network). The setting field (printer information registration-setting field) 1007 is a field for setting the acquisition of the information from information input by the user. The setting field (USB-connected printer registration-setting field) 1008 is a filed for setting the acquisition of the information from an MFP connected via USB. The next button 1009 is an operation button for setting detailed information associated with a setting selected from the setting fields 1006 to 1008. Then, when the CPU 201 detects that one of the setting fields 1006 to 1008 has been selected and the next button 1009 is selected by the user, the CPU 201 determines whether or not the setting field 1006 has been selected (step S909).

Figure 11A:
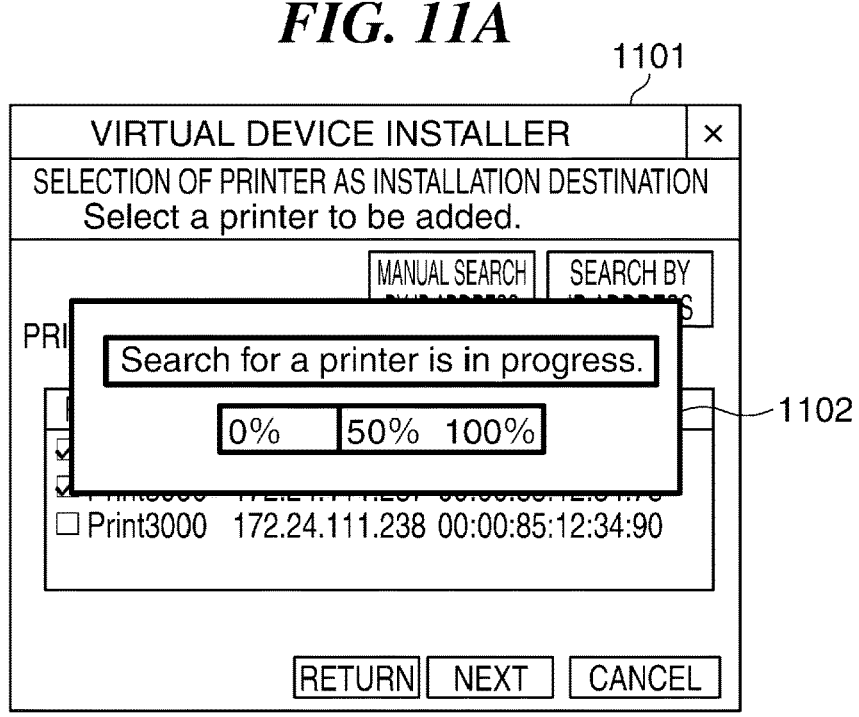
FIG. 11A is a diagram showing a search result-displaying screen displayed on the PC during execution of search processing.
Figure 11B:
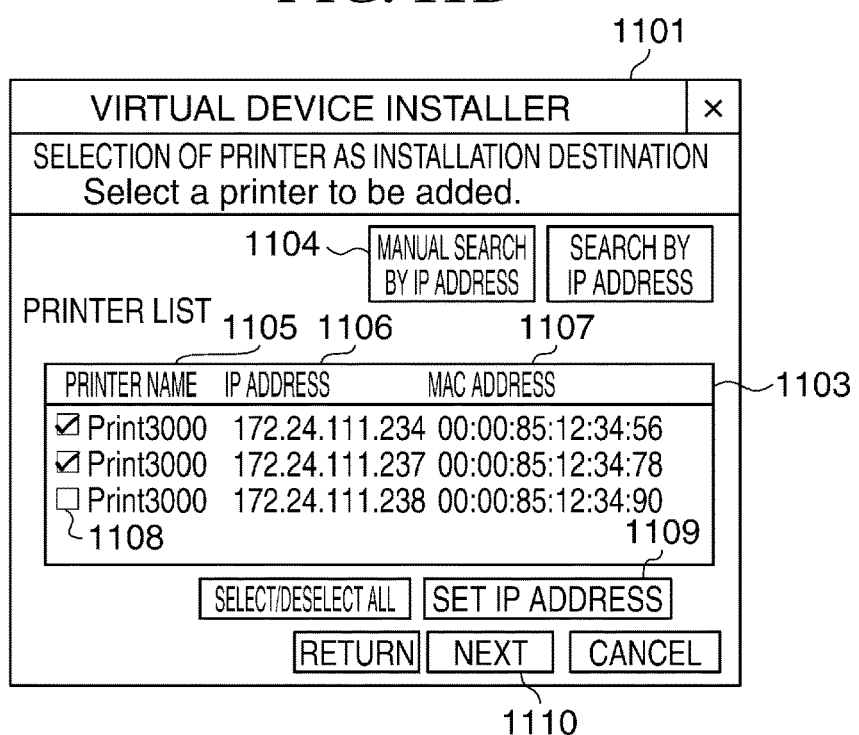
FIG. 11B is a diagram showing a search result-displaying screen displayed on the PC when search processing is completed.

If it is determined in the step S909 that the setting field 1006 has been selected, the CPU 201 starts search processing for searching for MFPs connected to the LAN 103 (step S910). Then, the CPU 201 displays a status window 1102 indicative of the execution status of the search processing on a search result-displaying screen 1101 shown in FIG. 11A (step S911). Then, when the execution of the search processing is completed, the CPU 201 terminates the display of the status window 1102, and displays the search result-displaying screen 1101 including a result of the search processing, as shown in FIG. 11B. The search result-displaying screen 1101 includes a search result list 1103, a manual search button 1104, and an IP address-setting button 1109. The search result list 1103 includes the items of printer name 1105, IP address 1106, and Mac address 1107, and a check box 1108 provided in front of each printer name 1105. The printer name 1105 is a name of each MFP connected to the LAN 103, the IP address 1106 is an IP address of the MFP, and the Mac address 1107 is a Mac address of the MFP. Each check box 1108 is used for selecting an MFP associated therewith. The manual search button 1104 is a button for setting the execution of search processing for searching for an MFP having an IP address input by the user. The IP address-setting button 1109 is a button for setting the execution of processing for changing the IP address of an MFP selected on the search result list 1103. A next button 1110 is an operation button for setting detailed information associated with each setting made on the search result-displaying screen 1101. Then, the CPU 201 determines whether or not the manual search button 1104 is selected by the user (step S912).

Figure 12A:
FIG. 12A is a diagram showing a screen displayed on the PC, for use in inputting an IP address used for search processing.

If it is determined in the step S912 that the manual search button 1104 is selected, the CPU 201 displays an input screen 1200, shown in FIG. 12A, for enabling the user to input an IP address (step S913). The input screen 1200 includes a setting field 1201 and an OK button 1202. An IP address is input in the setting field 1201 by the user, and the OK button 1202 is for setting the start of processing for searching for the MFP having the input IP address. Then, when the CPU 201 detects that an IP address has been input in the setting field 1201 and the OK button 1202 is selected by the user, the CPU 201 starts search processing using the input IP address (step S914). Then, when the execution of the search processing using the input IP address is completed, the CPU 201 returns to the step S911.

If it is determined in the step S912 that the manual search button 1104 is not selected, the CPU 201 determines whether or not the IP address-setting button 1109 is selected (step S915).

Figure 12B:
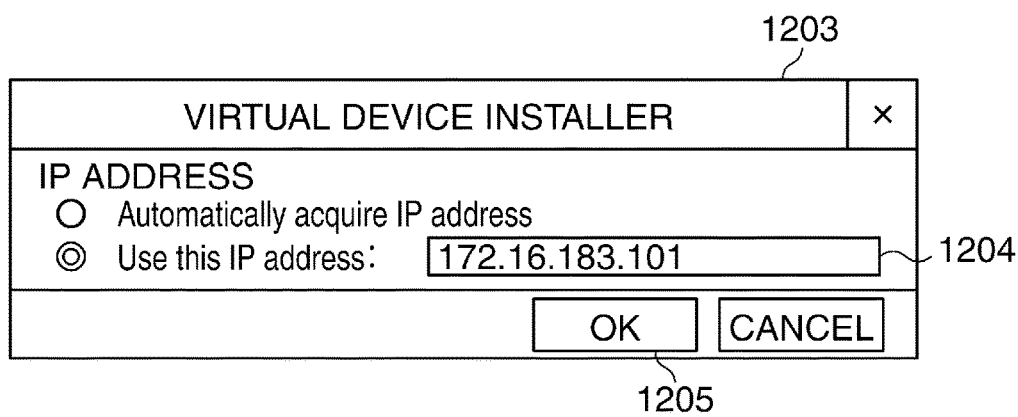
FIG. 12B is a diagram showing a screen displayed on the PC, for use in inputting an IP address used for processing for changing the IP address.

If it is determined in the step S915 that the IP address-setting button 1109 is selected, the CPU 201 displays an input screen 1203, shown in FIG. 12B, for enabling the user to input an IP address (step S916). The input screen 1203 includes a setting field 1204 and an OK button 1205. The setting field 1204 is a field for inputting a new IP address of the MFP selected on the search result list 1103, and the OK button is for setting the execution of processing for changing the IP address based on the input IP address. Then, when the CPU 201 detects that an IP address has been input in the setting field 1204 and the OK button 1205 is selected by the user, the CPU 201 performs processing for changing the IP address based on the input IP address (step S917), and returns to the step S911.

If it is determined in the step S915 that the IP address-setting button 1109 is not selected, the CPU 201 determines whether or not the next button 1110 is selected (step S918).

If it is determined in the step S918 that the next button 1110 is not selected, the CPU 201 executes the step S911 et seq. On the other hand, if it is determined in the step S918 that the next button 1110 is selected, the CPU 201 checks the setting in each check box 108 on the search result list 1103 (step S919). Then, the CPU 201 determines whether or not any of the check boxes 1108 has been selected on the search result list 1103 (step S920).

If it is determined in the step S920 that none of the check boxes 1108 has been selected on the search result list 1103, the CPU 201 returns to the step S911. On the other hand, if it is determined in the step S920 that one of the check boxes 1108 has been selected on the search result list 1103, the CPU 201 executes a step S929 et seq., described hereinafter.

If it is determined in the step S909 that the setting field (search & registration-setting field) 1006 has not been selected, the CPU 201 determines whether or not the setting field (printer information registration-setting field) 1007 has been selected (step S921).

Figure 12C:
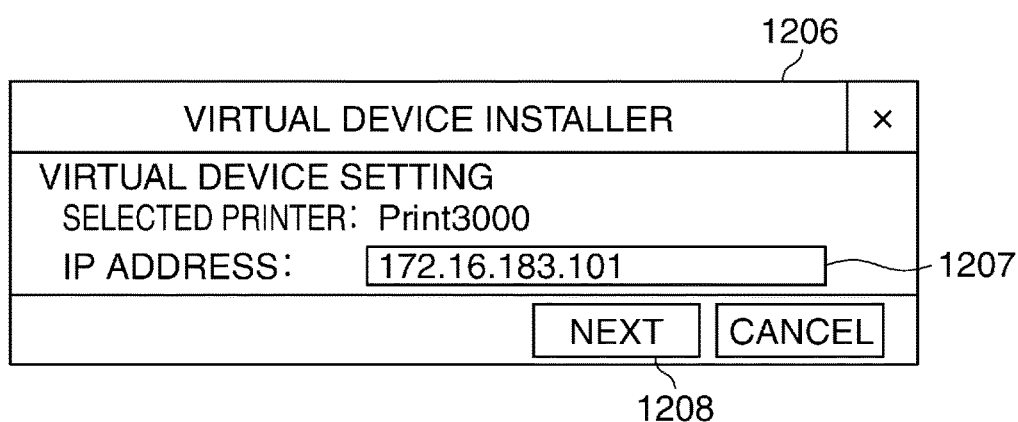
FIG. 12C is a diagram showing a screen displayed on the PC, for use in for inputting an IP address for registration.

If it is determined in the step S921 that the setting field 1007 has been selected, the CPU 201 displays an input screen 1206, shown in FIG. 12C, for enabling the user to input information on the MFP (step S922). The input screen 1206 includes an input field 1207 and a next button 1208. The input field 1207 is for inputting an IP address of the MFP, and the next button 1208 is for setting the input IP address. Then, when the CPU 201 detects that the IP address has been input in the setting field 1207 and the next button 1208 is selected, the CPU 201 executes the step S929 et seq., described hereinafter.

If it is determined in the step S921 that the setting field (printer information registration-setting field) 1007 has not been selected, i.e. if the setting field (USB-connected printer registration-setting field) 1008 has been selected, the CPU 201 displays a USB connection screen, not shown, including a communication start button for instructing to start data communication with any MFP connected via a USB cable (step S923). Then, if the communication start button is selected by the user (YES to a step S924), the CPU 201 performs data communication with any MFP connected via the USB cable (step S925). Then, the CPU 201 determines whether or not a plurality of MFPs are connected (step S926).

Figure 13:
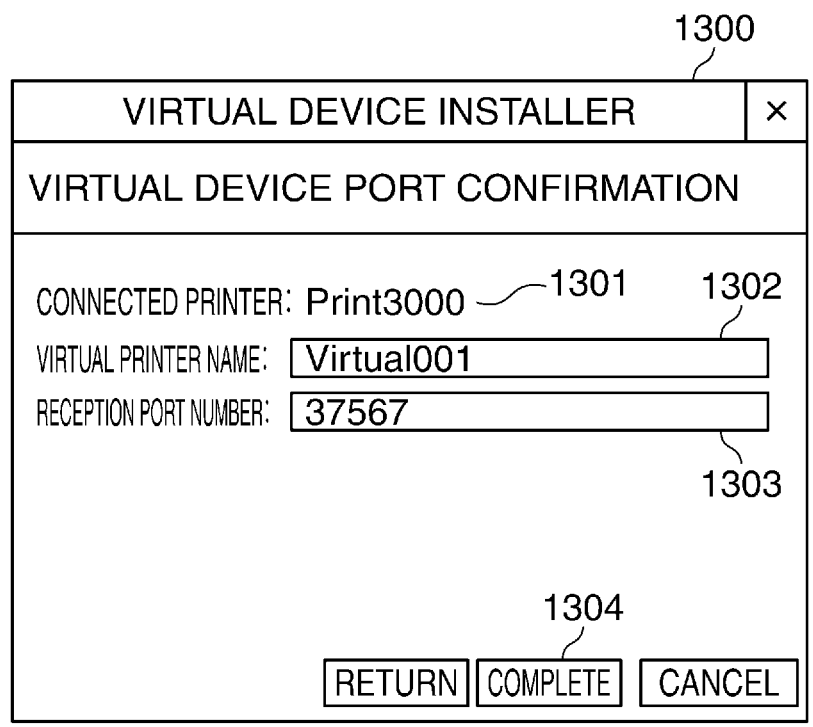
FIG. 13 is a diagram showing an example of a port confirmation screen displayed on the PC.

If it is determined in the step S926 that only one MFP is connected, the CPU 201 executes the step S929 et seq., described hereinafter. On the other hand, if it is determined in the step S926 that the a plurality of MFPs are connected, the CPU 201 displays a list screen, not shown, for selecting a desired MFP from the plurality of connected MFPs (step S927). Then, when one of the MFPs is selected on the above-mentioned list screen (YES to a step S928), the process proceeds to the step S929. In the step S929, the CPU 201 generates port information (installation related information) of the virtual device module 112 corresponding to the selected MFP (step S929). The port information includes a port number and an IP address of the virtual device module 112. After that, the CPU 201 stores the generated port information in the RAM 202. Then, the CPU 201 displays a port confirmation screen 1300, shown in FIG. 13, based on the generated port information (step S930). The port confirmation screen 1300 includes a name 1301 of the MFP (MFP 102 in the illustrated example), a name 1302 of the virtual device module 112 corresponding to the MFP 102, a reception port number 1303 of the virtual device module 112, and a complete button 1304. When the complete button 1304 is selected by the user (YES to a step S931), the CPU 201 terminates the present process.

Figure 14A:
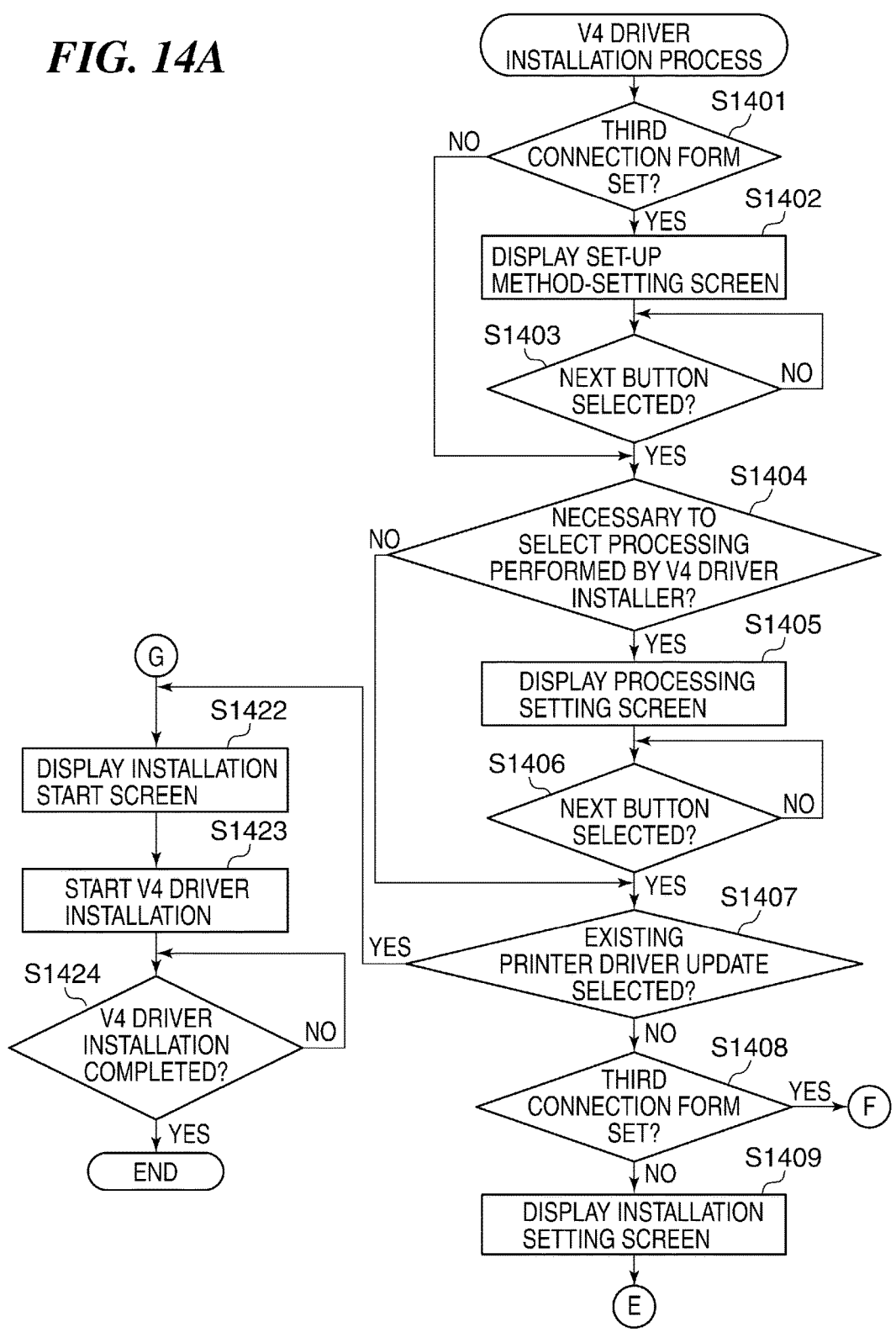
FIG. 14A is a flowchart of a V4 driver installation process performed in a step of the integrated installer-executing process in FIG. 4.
Figure 14B:
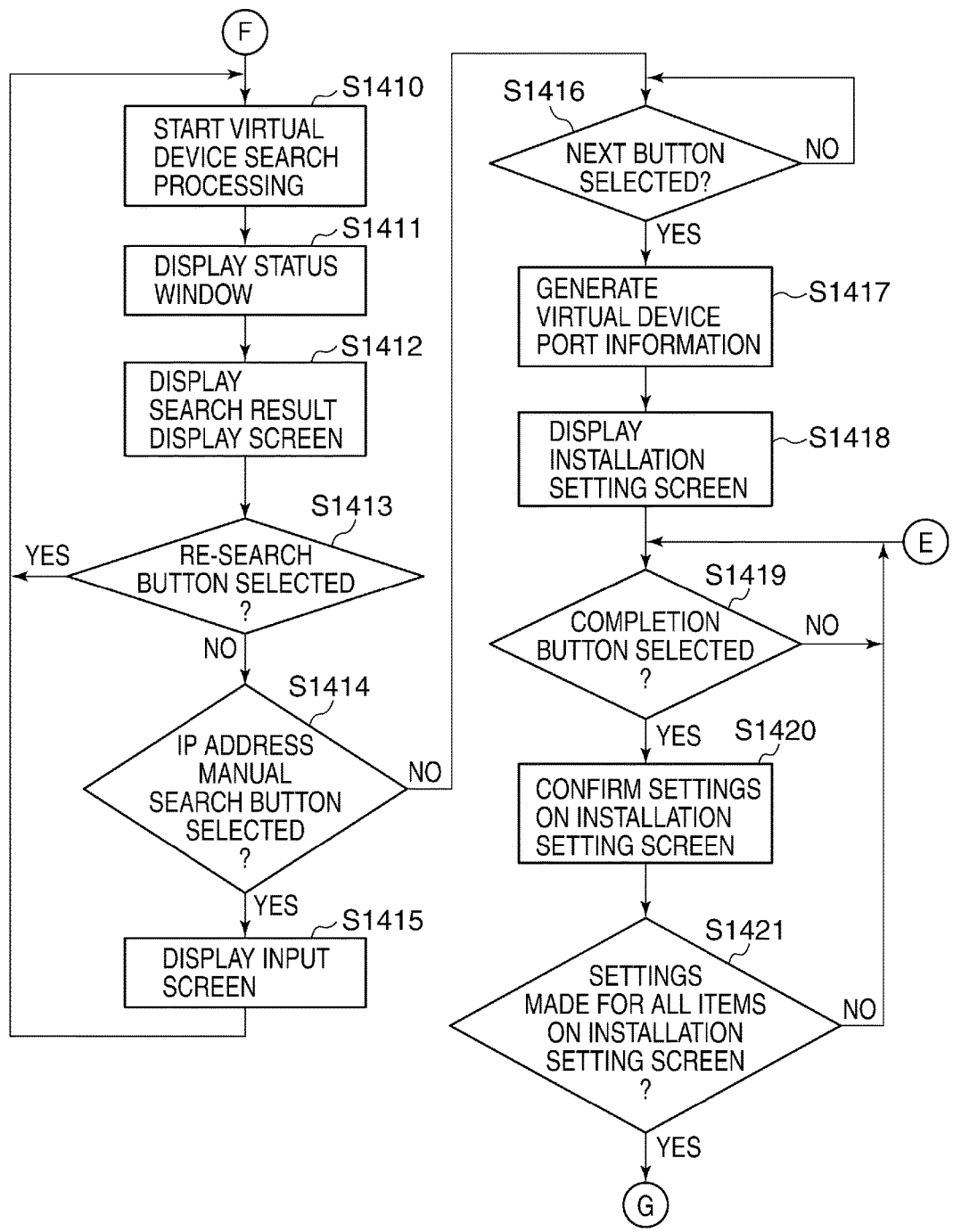
FIG. 14B is a continuation of FIG. 14A.

FIGS. 14A and 14B are a flowchart of the V4 driver installation process performed in the step S413 in FIG. 4.

Referring to FIGS. 14A and 14B, first, the CPU 201 determines whether or not the third connection form has been set (step S1401).

Figure 15A:
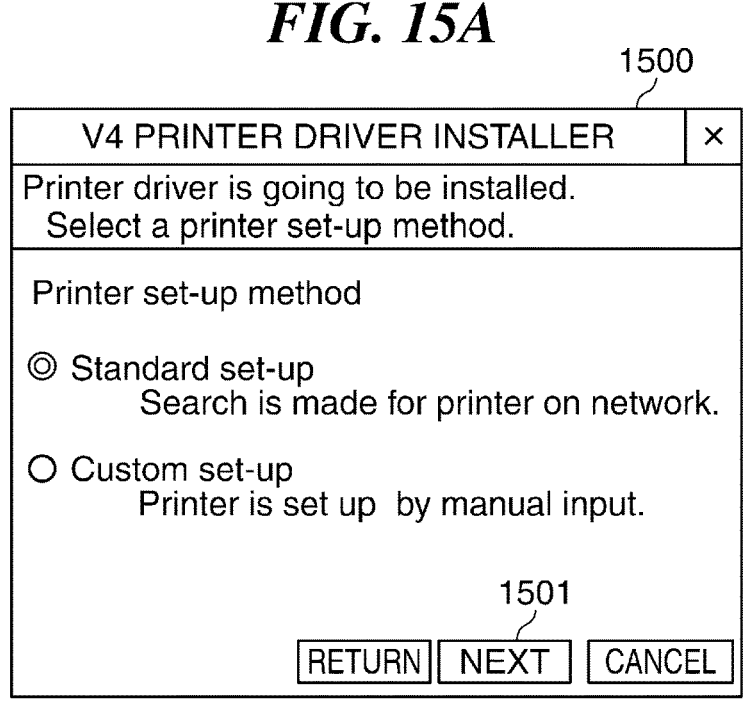
FIG. 15A is a diagram showing a set-up method-setting screen displayed on the PC.

If it is determined in the step S1401 that not the third connection form, but the first or second connection form has been set, the CPU 201 executes a step S1404 et seq., described hereinafter. On the other hand, if it is determined in the step S1401 that the third connection form has been set, the CPU 201 displays a set-up method-setting screen 1500, shown in FIG. 15A, for setting a method of setting up the V4 driver 106 (step S1402). The set-up method-setting screen 1500 includes a next button 1501 for deciding the setting of a method selected on the set-up method-setting screen 1500. In the present embodiment, the method of setting up the V4 driver 106 is selected from the options of standard set-up and custom set-up. Then, when the next button 1501 is selected on the set-up method-setting screen 1500 (YES to a step S1403), the CPU 201 determines whether or not it is necessary to select processing to be performed by the V4 driver installer 303 (step S1404).

Figure 15B:
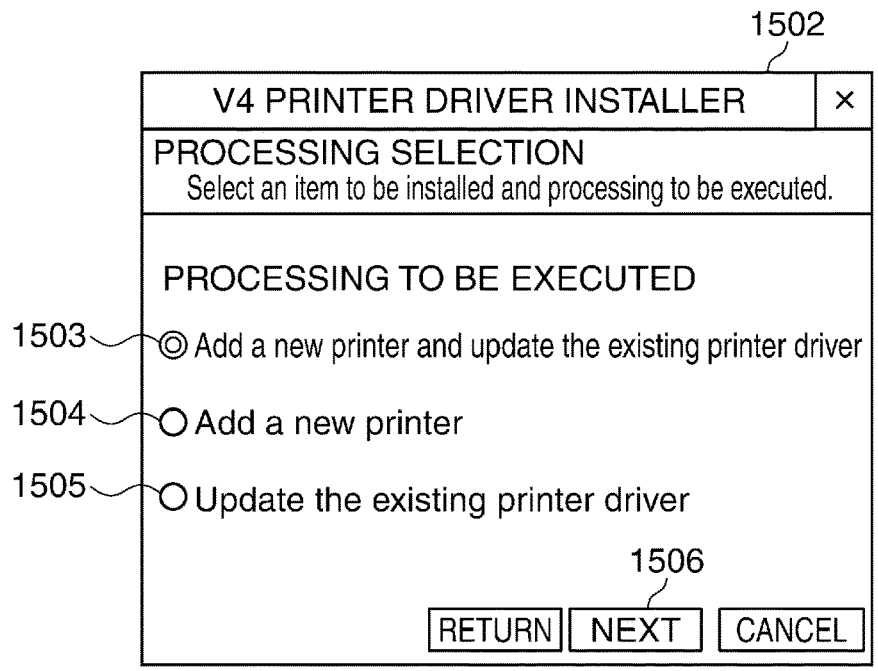
FIG. 15B is a diagram showing a processing setting screen displayed on the PC.

If it is determined in the step S1404 that it is unnecessary to select processing to be performed by the V4 driver installer 303, the CPU 201 executes a step S1407 et seq., described hereinafter. On the other hand, if it is determined in the step S1404 that it is necessary to select processing to be performed by the V4 driver installer 303, the CPU 201 displays a processing setting screen 1502, shown in FIG. 15B, for setting processing to be performed by the V4 driver installer 303 (step S1405). The processing setting screen 1502 includes setting fields 1503 to 1505 and a next button 1506. The setting field (printer addition & driver update-setting field) 1503 is a field for setting the execution of processing for adding a new MFP and processing for updating the existing printer driver module. The setting field (new printer addition-setting field) 1504 is a field for setting the execution of processing for adding a new MFP. The setting field (existing printer driver update-setting field) 1505 is a field for setting the execution of processing for updating the existing printer driver module. The next button 1506 is an operation button for setting detailed information associated with a setting selected from the setting fields 1503 to 1505. Then, when one of the setting fields 1503 to 1505 has been selected and the next button 1506 is selected by the user (YES to a step S1406), the CPU 201 determines whether or not the setting field (existing printer driver update-setting field) 1505 has been selected (step S1407).

If it is determined in the step S1407 that the setting field 1505 has been selected, i.e. if the execution of processing for updating the existing printer driver module has been set, the CPU 201 executes a step S1422 et seq., described hereinafter. On the other hand, if it is determined in the step S1407 that not the setting field 1505, but one of the setting fields 1503 and 1504 has been selected, i.e. if the selected option includes execution of processing for adding a new MFP is included, the CPU 201 determines whether or not the third connection form has been selected (step S1408).

If it is determined in the step S1408 that not the third connection form, but the first or second connection form has been selected, the CPU 201 acquires the port information generated in the process in FIGS. 9A and 9B, thereafter generates port information for performing data communication between the V4 driver 106 and the virtual device module 112 (hereinafter referred to as the "virtual device port information") based on the acquired port information, and displays an installation setting screen 1600, shown in FIG. 16A, for enabling the user to make settings concerning the installation of the V4 driver 106 using the generated virtual device port information (step S1409). The installation setting screen 1600 includes an IP address 1601, a port number 1602, a port name 1603, and a printer name 1604. The IP address 1601 is an IP address of the virtual device module 112, and the port number 1602 is a port number of the virtual device module 112. The port name 1603 is a name which is uniquely set to the port number, and the printer name 1604 is a name of the MFP 102. In the step S1409, the IP address 1601 and the port number 1602 are automatically set to the IP address and the port number included in the acquired port information, and are grayed out for preventing the user from editing the settings. Then, after execution of the step S1409, the CPU 201 executes a step S1419 et seq., described hereinafter.

If it is determined in the step S1408 that the third connection form has been selected, the CPU 201 starts virtual device search processing for searching for the virtual device module 112 of the server 503 connected via the LAN 504 (step S1410). Then, the CPU 201 displays a status window showing the execution status of the virtual device search processing (step S1411). Next, when the execution of the virtual device search processing is completed, the CPU 201 displays a search result-displaying screen 1606, shown in FIG. 16B, including a result of the virtual device search processing (step S1412). The search result-displaying screen 1606 includes a result list 1607, a re-search button 1608, an IP address manual search button 1609, and a next button 1610. The result list 1607 shows an IP address and a port number of each virtual device module retrieved by the virtual device search processing. The re-search button 1608 is an operation button for instructing to re-execute the virtual device search processing. The IP address manual search button 1609 is an operation button for instructing to execute virtual device search processing for searching for an IP address input by a user. The next button 1610 is an operation button for generating the virtual device port information. Then, the CPU 201 determines whether or not the re-search button 1608 is selected on the search result-displaying screen 1606 (step S1413).

If it is determined in the step S1413 that the re-search button 1608 is selected on the search result-displaying screen 1606, the CPU 201 returns to the step S1410. On the other hand, if it is determined in the step S1413 that the re-search button 1608 is not selected on the search result-displaying screen 1606, the CPU 201 determines whether or not the IP address manual search button 1609 is selected (step S1414).

If it is determined in the step S1414 that the IP address manual search button 1609 is selected, the CPU 201 displays an input screen, not shown, for enabling the user to input an IP address (step S1415). After that, when an IP address is input on the input screen, the CPU 201 returns to the step S1410.

If it is determined in the step S1414 that the IP address manual search button 1609 is not selected, the process proceeds to a step S1416, wherein the CPU 201 determines whether or not the next button 1610 is selected If it is determined in the step S1416 that the next button 1610 is selected (YES to the step S1416), the CPU 201 generates virtual device port information (step S1417). Then, the CPU 201 displays the installation setting screen 1600 using the generated virtual device port information (step S1418). In the step S1418, the IP address 1601 and the port number 1602 are displayed in a manner editable by the user. Then, in the step S1418, the CPU 201 determines whether or not a complete button 1605 is selected on the installation setting screen 1600. If it is determined in the step S1419 that the complete button 1605 is selected on the installation setting screen 1600 (YES to the step S1419), the CPU 201 confirms the settings on the installation setting screen 1600 (step S1420). More specifically, the CPU 201 confirms the settings of the IP address 1601, the port number 1602, the port name 1603, and the printer name 1604. Then, the CPU 201 determines whether or not settings have been made for all of the items on the installation setting screen 1600 (step S1421).

Figure 17:
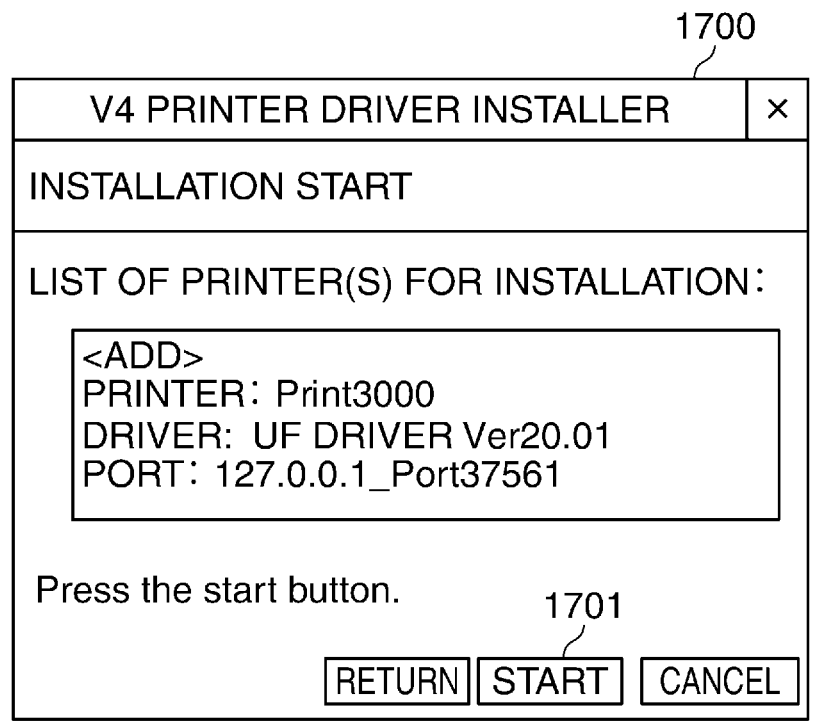
FIG. 17 is a diagram showing an example of an installation start screen displayed on the PC.

If it is determined in the step S1421 that a setting has not been made for any of the IP address 1601, the port number 1602, the port name 1603, and the printer name 1604, the CPU 201 returns to the step S1419. On the other hand, if it is determined in the step S1421 that all settings of the items on the installation setting screen 1600 have been made, the CPU 201 displays an installation start screen 1700 shown in FIG. 17 (step S1422). The installation start screen 1700 includes a start button 1701 for instructing to start installation of the V4 driver 106. Then, when the start button 1701 has been selected, the CPU 201 starts installation of the V4 driver 106 (step S1423), and when the V4 driver 106 has been installed (YES to a step S1424), the CPU 201 terminates the present process.

Figure 18:
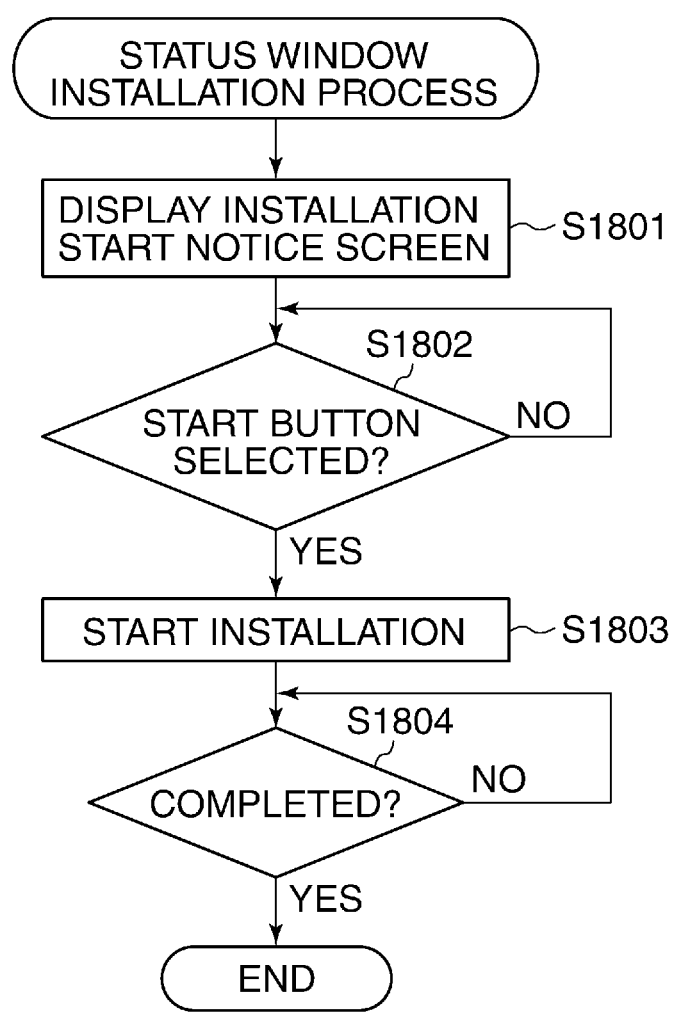
FIG. 18 is a flowchart of a status window installation process performed in a step of the integrated installer-executing process in FIG. 4.

FIG. 18 is a flowchart of the status window installation process performed in the step S414 in FIG. 4.

Referring to FIG. 18, first, the CPU 201 displays an installation start notice screen, not shown, including a start button for instructing to start installation of the status window module 109 (step S1801). Then, when the start button has been selected (YES to a step S1802), the CPU 201 starts installation of the status window module 109 (step S1803), and when the status window module 109 has been installed (YES to a step S1804), the CPU 201 terminates the present process.

Figure 19:
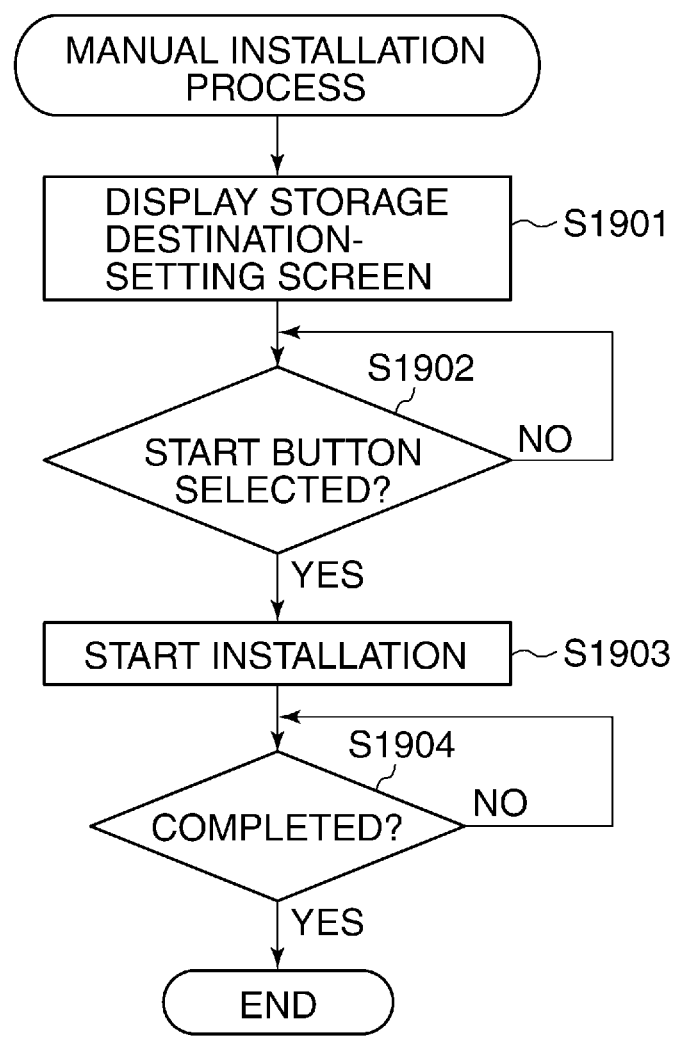
FIG. 19 is a flowchart of a manual installation process performed in a step of the integrated installer-executing process in FIG. 4.

FIG. 19 is a flowchart of the manual installation process performed in the step S415 in FIG. 4.

Referring to FIG. 19, first, the CPU 201 displays a storage destination-setting screen, not shown, for setting a storage destination of a manual to be installed (step S1901). The storage destination-setting screen includes a start button for instructing to start installation of the manual. Then, when the start button has been selected (YES to a step S1902), the CPU 201 starts installation of the manual (step S1903), and when the manual has been installed (YES to a step S1904), the CPU 201 terminates the present process.

According to the processes described above with reference to FIGS. 4, 9A, 9B, 14A, 14B, 18, and 19, installation of required ones of the plurality of modules is performed based on a set form of connection. As a consequence, even when the required modules are different between forms of connection, it is possible to eliminate the need for a user to grasp modules required for each form of connection in advance, which enables the user to easily install desired modules.

Further, in the processes described above with reference to FIGS. 4, 9A, 9B, 14A, 14B, 18, and 19, the order of installation of required modules is decided based on the set usage form. Therefore, even when the order of installation of required modules is different between usage forms, it is possible to eliminate the need for the user to grasp the order of installation of modules associated with each usage form in advance.

Further, in the processes described above with reference to FIGS. 4, 9A, 9B, 14A, 14B, 18, and 19, the port information used for execution of installation of the virtual device-associated module 110 is used for execution of installation of the V4 driver 106, which is performed after installation of the virtual device-associated module 110. Therefore, the same information as the port information set by the user when executing installation of the virtual device-associated module 110 is set when executing installation of the F4 driver 106. That is, it is possible to eliminate the need of setting the same port information a plurality of times, whereby it is possible to reduce user's time and effort for setting the port information.

In the processes described above with reference to FIGS. 4, 9A, 9B, 14A, 14B, 18, and 19, the port information includes at least the port number and the IP address of the virtual device module 112. This makes it possible to eliminate the need for the user to repeatedly set the port number and the IP address of the virtual device module 112.

Further, in the processes described above with reference to FIGS. 4, 9A, 9B, 14A, 14B, 18, and 19, when the first or second connection form is set, the virtual device-associated module 110 is installed. As a consequence, for example, in the first connection form or the second connection form in which an apparatus, such as the PC 101 and the server 503, is required to be directly connected to the MFP and thereby directly perform data communication with the MFP, it is possible to positively perform direct data communication with the MFP. Further, when the third connection form is set, the virtual device-associated module 110 is not installed. This makes it possible to prevent installation of a module which is unnecessary for the third connection form in which the PC 501 is not directly connected to the MFP 504 and is not required to perform data communication with the MFP 504.

While the present invention has been described with reference to exemplary embodiments, it is to be understood that the invention is not limited to the disclosed exemplary embodiments.

For example, in a case where installation of the virtual device-associated module 110 fails, it is unnecessary to install other modules.

Figure 20:
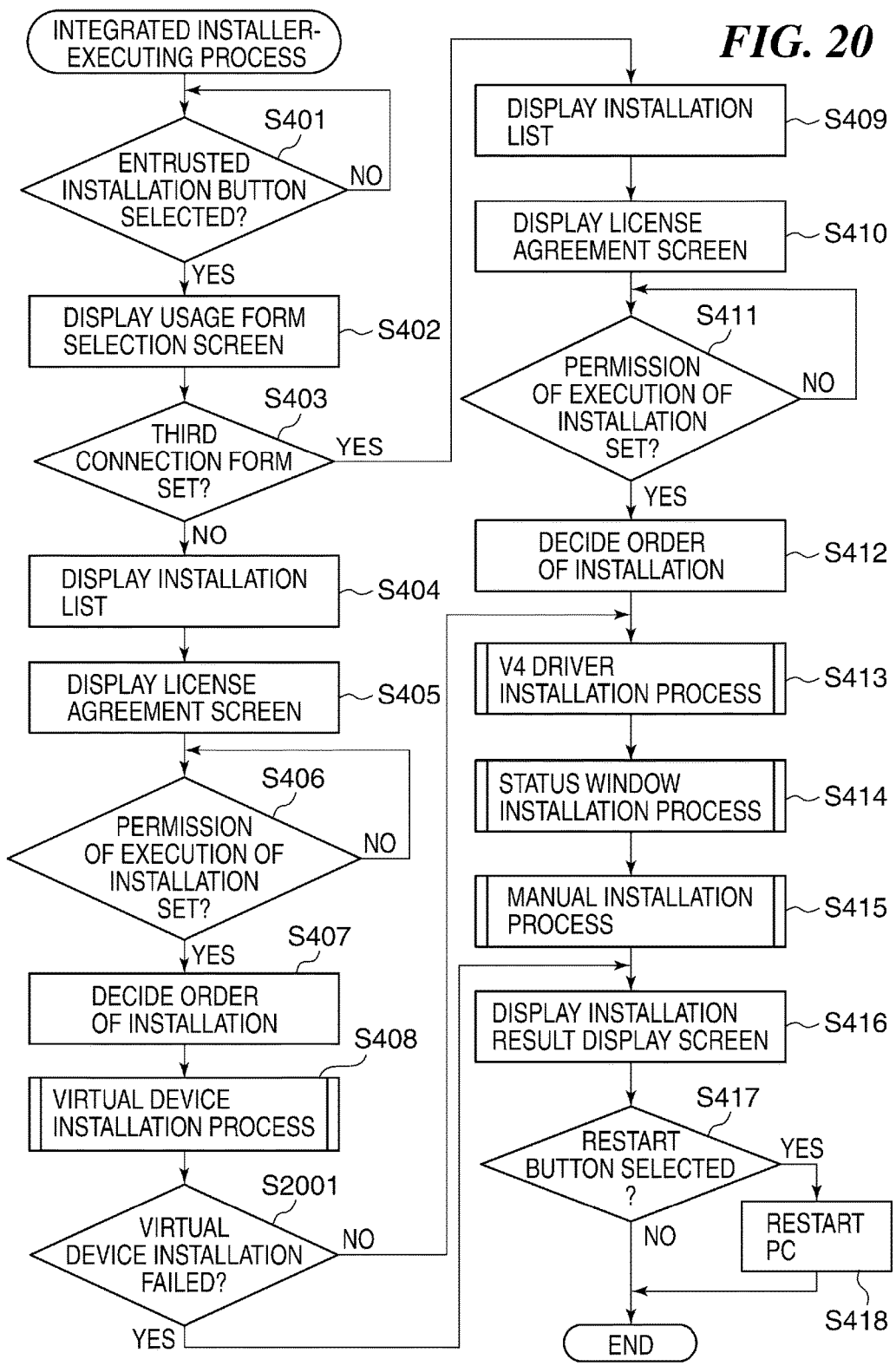
FIG. 20 is a flowchart of a variation of the integrated installer-executing process in FIG. 4.

FIG. 20 is a flowchart of a variation of the integrated installer-executing process in FIG. 4.

The process in FIG. 20 is performed by the CPU 201, appearing in FIG. 2, executing a control program stored in the ROM 204.

Here, if the virtual device-associated module 110 is not installed, the PC 101 cannot perform data communication with the MFP 102 using the virtual device module 112 of the virtual device-associated module 110. Therefore, even when the PC 101 generates print data, the PC 101 cannot transmit the generated print data to the MFP 102, so that the PC 101 and the MFP 102 cannot perform print processing.

To cope with this, in the present embodiment, installation of the virtual device-associated module 110 of the plurality of modules is first performed, and if installation of the virtual device-associated module 110 fails, installation of other modules is stopped.

Referring to FIG. 20, first, the CPU 201 performs the same processing as the steps S401 to S408 in FIG. 4. Then, the CPU 201 determines whether or not installation of the virtual device-associated module 110 has failed (step S2001).

If it is determined in the step S2001 that installation of the virtual device-associated module 110 is successful, the CPU 201 executes the step S413 et seq. On the other hand, if it is determined that installation of the virtual device-associated module 110 has failed, the CPU 201 executes the step S416 et seq.

If it is determined in the step S403 that the third connection form has been selected, the CPU 201 executes the step S409 et seq.

In the above-described process in FIG. 20, installation of the virtual device-associated module 110 is performed first, and if installation of the virtual device-associated module 110 fails, installation of the V4 driver 106, the status window module 109, and the manual is aborted. This makes it possible to prevent occurrence of a problem that print processing by the PC 101 and the MFP 102 cannot be performed because the virtual device-associated module 110 has not been installed.

Further, in the present embodiment, installation of each module can be temporarily interrupted e.g. according to a user's instruction, and when the interrupted installation of each module is resumed, as information used for installation, information generated before the interruption may be used. For example, in a case where installation of the virtual device-associated module 110 is temporarily interrupted, and then is resumed, the port information generated before the interruption is used as the port information used for installation of the virtual device-associated module 110. This makes it possible to eliminate the need of generating, whenever installation of each module is interrupted, information used for installation of the module, whereby it is possible to reduce the load of generating information used for installation of each module in the case where installation of each module is interrupted.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The scope of the following claims is to be accorded the broadest interpretation so as to encompass all such modifications and equivalent structures and functions.

This application claims the benefit of Japanese Patent Application No. 2015-235823 filed Dec. 2, 2015, which is hereby incorporated by reference herein in its entirety.

What is claimed is:

1. An information processing apparatus into which a plurality of modules are installed for performing print processing in an image processing apparatus, comprising:
   a display device; and
   processing circuitry configured to cause the information processing apparatus to:
      set a usage form of the information processing apparatus, the usage form of the information processing apparatus being a form of network connection between the information processing apparatus and the image processing apparatus;
      display, on the display device, required ones of the plurality of modules based on the set usage form of network connection between the information processing apparatus and the image processing apparatus; and
      install the displayed required ones of the plurality of modules such that the print processing can be performed in the image processing apparatus according to the set usage form of network connection between the information processing apparatus and the image processing apparatus.

2. The information processing apparatus according to claim 1, wherein the processing circuitry is further configured to cause the information processing apparatus to decide an order of installation of the required modules based on the set usage form of network connection between the information processing apparatus and the image processing apparatus.

3. The information processing apparatus according to claim 2, wherein the processing circuitry is further configured to cause the information processing apparatus to set installation related information used for execution of installation of each of the required modules,
wherein the installation related information used for execution of installation of one module of the required modules is used for execution of installation of another module, which is performed after installation of the one module.

4. The information processing apparatus according to claim 3, wherein the installation related information includes at least a port number and an IP address of the one module.

5. The information processing apparatus according to claim 1,
wherein the form of network connection between the information processing apparatus and the image processing apparatus includes a first connection form in which the information processing apparatus and the image processing apparatus are directly connected to each other, a second connection form in which the information processing apparatus is directly connected to each of the image processing apparatus and another information processing apparatus, and a third connection form in which the information processing apparatus is connected to the image processing apparatus via another information processing apparatus.

6. The information processing apparatus according to claim 5, further comprising:
an interface,
wherein the plurality of modules include at least a data communication module for performing data communication with the image processing apparatus via the interface, and
wherein in a case where the first connection form or the second connection form is set, the processing circuitry is configured to cause the information processing apparatus to install the data communication module, whereas in a case where the third connection form is set, the data communication module is not installed.

7. The information processing apparatus according to claim 6, wherein the processing circuitry is further configured to, in the case where the first connection form or the second connection form is set, determine whether or not installation of the data communication module is successful, and
wherein, of the plurality of modules, the data communication module is first subjected to execution of installation thereof, and
wherein in a case where installation of the data communication module fails, installation of other modules of the plurality of modules is stopped.

8. The information processing apparatus according to claim 1, wherein the plurality of modules include a module which constructs a device driver, a module which constructs an application for displaying a status of the image processing apparatus, and a virtual device module which communicates with the module which constructs the device driver.

9. A method of controlling an information processing apparatus into which a plurality of modules are installed for performing print processing in an image processing apparatus, comprising:
setting a usage form of the information processing apparatus, the usage form of the information processing apparatus being a form of network connection between the information processing apparatus and the image processing apparatus;
displaying required ones of the plurality of modules based on the set usage form of network connection between the information processing apparatus and the image processing apparatus; and
installing the displayed required ones of the plurality of modules such that the print processing can be performed in the image processing apparatus according to the set usage form of network connection between the information processing apparatus and the image processing apparatus.

10. A non-transitory computer-readable storage medium storing a computer-executable program for executing a method of controlling an information processing apparatus into which a plurality of modules are installed for performing print processing in an image processing apparatus,
wherein the method comprises:
setting a usage form of the information processing apparatus, the usage form of the information processing apparatus being a form of network connection between the information processing apparatus and the image processing apparatus;
displaying required ones of the plurality of modules based on the set usage form of network connection between the information processing apparatus and the image processing apparatus; and
installing the displayed required ones of the plurality of modules such that the print processing can be performed in the image processing apparatus according to the set usage form of network connection between the information processing apparatus and the image processing apparatus.

* * * * *